(12) United States Patent
Jauss et al.

(10) Patent No.: US 12,287,867 B2
(45) Date of Patent: Apr. 29, 2025

(54) METHOD AND DEVICE FOR OPERATING A COMPUTING DEVICE

(71) Applicant: Robert Bosch GmbH, Stuttgart (DE)

(72) Inventors: Manuel Jauss, Wissgoldingen (DE); Mustafa Kartal, Renningen (DE); Razvan Florin Aguridan, Leonberg (DE); Roland Steffen, Heimsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 186 days.

(21) Appl. No.: 17/785,163

(22) PCT Filed: Dec. 16, 2020

(86) PCT No.: PCT/EP2020/086404
§ 371 (c)(1),
(2) Date: Jun. 14, 2022

(87) PCT Pub. No.: WO2021/122734
PCT Pub. Date: Jun. 24, 2021

(65) Prior Publication Data
US 2023/0021594 A1    Jan. 26, 2023

(30) Foreign Application Priority Data

Dec. 20, 2019    (DE) ............... 10 2019 220 461.9

(51) Int. Cl.
*G06F 21/53* (2013.01)
*G06F 9/54* (2006.01)
(Continued)

(52) U.S. Cl.
CPC ........ *G06F 21/53* (2013.01); *G06F 2221/033* (2013.01); *G06F 2221/2105* (2013.01); *G06F 2221/2113* (2013.01)

(58) Field of Classification Search
CPC ............... G06F 21/53; G06F 2221/033; G06F 2221/2105; G06F 2221/2113
(Continued)

(56) References Cited

U.S. PATENT DOCUMENTS

2003/0084196 A1* 5/2003 Chang ..................... G06F 9/546
718/104
2015/0212952 A1* 7/2015 Wegner .................. G06F 8/656
711/152
2023/0365162 A1* 11/2023 Hallaczek ....... B60W 60/00188

FOREIGN PATENT DOCUMENTS

DE    102014201682 A1    7/2015
EP    3357761 A1    8/2018
(Continued)

OTHER PUBLICATIONS

Ali Shuja Siddiqui; Secure Intra-Vehicular Communication over CANFD; Reasearch gate; Year:2018; pp. 1-6.*
(Continued)

*Primary Examiner* — Monjur Rahim
(74) *Attorney, Agent, or Firm* — NORTON ROSE FULBRIGHT US LLP; Gerard A. Messina

(57) ABSTRACT

A method for operating a computing device for a control unit of a motor vehicle. The computing device including a processor core, and is configured to control an exchange of data between a connectivity zone and a security zone. The security zone includes at least one component which is necessary to drive the vehicle and has an elevated relevance with regard to safety. The connectivity zone including at least one component whose operation requires communication outside of the vehicle but is not required to drive the vehicle and does not have an elevated relevance with regard to safety. At least one first program executable by the computing device is assigned to a non-trustworthy zone, and at least one further program is assigned to a trustworthy (Continued)

zone. The component of the connectivity zone is assigned to the non-trustworthy zone, and the component of the security zone being assigned to the trustworthy zone.

23 Claims, 21 Drawing Sheets

(51) Int. Cl.
  *G06F 12/14* (2006.01)
  *H04L 9/40* (2022.01)
(58) Field of Classification Search
  USPC .......................................................... 726/1
  See application file for complete search history.

(56) References Cited

FOREIGN PATENT DOCUMENTS

| | | | |
|---|---|---|---|
| JP | 2015067107 A | 4/2015 | |
| JP | 2019012950 A | 1/2019 | |
| WO | WO-2019074000 A1 * | 4/2019 | ........... B60R 16/023 |

OTHER PUBLICATIONS

International Search Report for PCT/EP2020/086404, Issued Mar. 30, 2021.
Agesen et al., "The Evolution of an X86 Virtual Machine Monitor," ACM SIGOPS Operating Systems Review, 2010, pp. 3-18. <https://course.ece.cmu.edu/~ece845/docs/vmware-evolution.pdf> Downloaded Jun. 13, 2022.
Gansel et al., "Towards Virtualization Concepts for Novel Automotive HMI Systems," IESS 2013, IFIP Advances in Information and Communication Technology, vol. 403, 2013, pp. 1-12. <https://dl.ifip.org/db/conf/iess/iess2013/GanseISDRM13.pdf> Downloaded Jun. 13, 2022.
Heiser, "The Role of Virtualization in Embedded Systems," Proceedings of the First Workshop on Isolation and Integration in Embedded Systems (IIES'08), 2008, pp. 1-6. <https://citeseerx.ist.psu.edu/viewdoc/download?doi=10.1.1.146.2977&rep=rep1&type=pdf> Downloaded Jun. 13, 2022.
Vmware White Paper, "Understanding Full Virtualization, Paravirtualization, and Hardware Assist," Vmware, 2008, pp. 1-17. <https://www.vmware.com/content/dam/digitalmarketing/vmware/en/pdf/techpaper/VMware_paravirtualization.pdf> Downloaded Jun. 13, 2022.
Wang et al., "A Trusted Computing Architecture of Embedded System Based on Improved TPM," MATEC Web of Conferences 139, 00151, 2017, pp. 1-4. <https://pdfs.semanticscholar.org/bcc3/1860a97d2d53531abfc9acd92c039751505d.pdf?_ga=2.165833847.830521389.1655131060-1376803359.1649261672> Downloaded Jun. 13, 2022.
Gu et al., "A State-of-the-Art Survey on Real-Time Issues in Embedded Systems Virtualization," Journal of Software Engineering and Applications, vol. 5, 2012, pp. 277-290. <https://www.scirp.org/pdf/JSEA20120400006_31629669.pdf> Downloaded Jun. 13, 2022.
Eivind Naess et al., "Configurable Middleware-Level Intrusion Detection for Embedded Systems," Proceedings of the 25th IEEE International Conference on Distributed Computing Systems Workshops (ICDCSW'05), vol. 3, 2005, pp. 1-8.

* cited by examiner

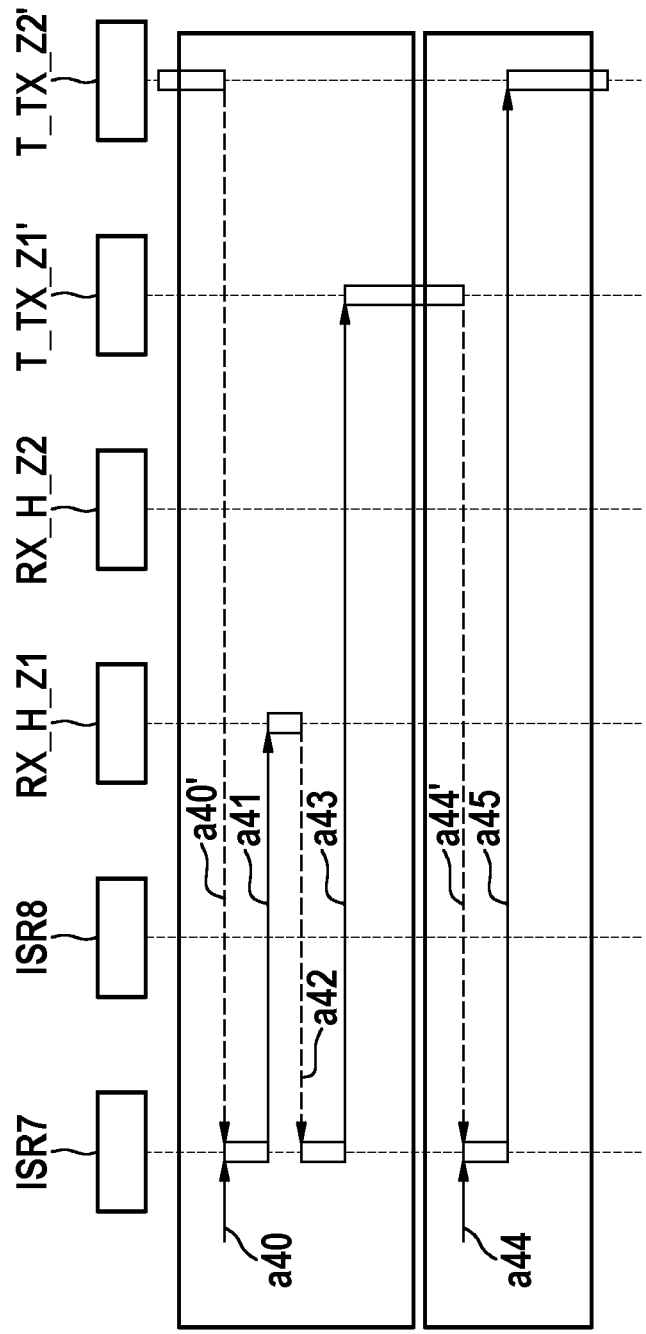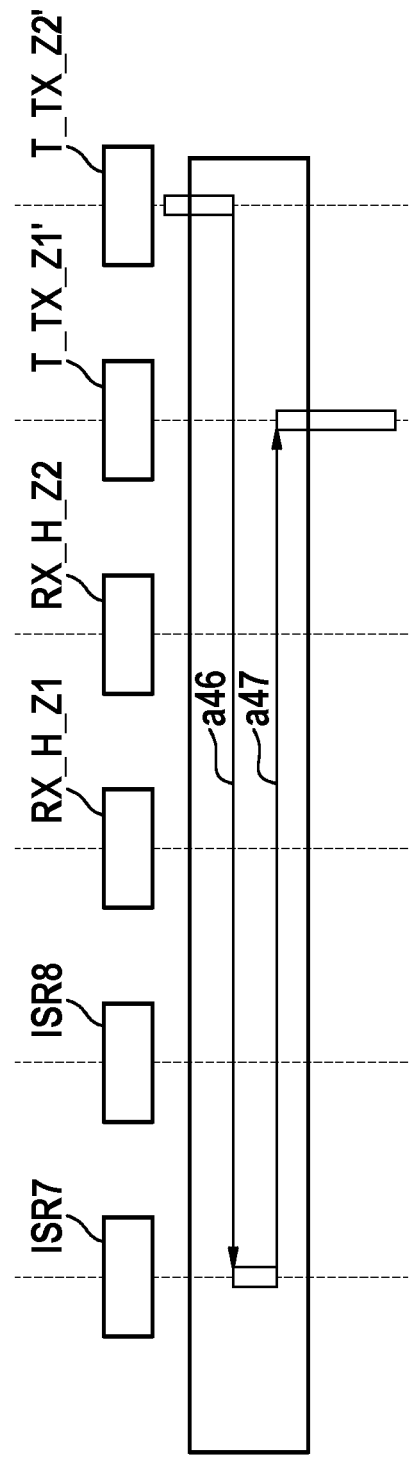

METHOD AND DEVICE FOR OPERATING A COMPUTING DEVICE

FIELD

The present invention relates to a method for operating a computing device having at least one processor core.

The present invention further relates to a device for executing such a method.

SUMMARY

In the context of highly networked, modern vehicles, in particular, due to the varied, external interfaces, the attack surface on computing devices, e.g., of control units and/or embedded systems, is increasing massively. In particular, the risk of a so-called remote attack is present, that is, a compromise, e.g., via the Internet, without a physical attack on the vehicle and/or the computing device. The principle according to the preferred specific embodiments may be advantageously used for efficiently preventing such remote attacks and/or other attacks on a computing device.

According to an example embodiment of the present invention, the possibilities of attack are reduced, in particular, by providing different zones, namely, at least one trustworthy and at least one non-trustworthy zone, which are assigned respective programs. An exchange of data between the different zones is improved by providing different buffer storage areas having different authorizations (read, write, but not: executive). Data only goes from the non-trustworthy zone over to the trustworthy zone, when the data is validated, but just in the non-trustworthy zone. This allows possibilities of manipulation to be limited further. In particular, cases of misuse due to incorrect programming, for example, in the case of incorrect return addresses, impermissible overwriting during buffer overflow/underflow, etc., may be minimized, in particular, by the use of a memory protection device, which steers the access rights to particular buffer storage areas for data exchange. The separation of zones may also be applied to interfaces, storage devices, and/or running times, through which the possibilities of misuse are further diminished. In addition, the influence of a corrupted zone is reduced further, using this concept. The concept may already be implemented in the case of a single multicore design approach. The concept may easily be scaled, that is, even more zones may be added in a particularly simple manner, as a function of the security architecture.

In one advantageous further refinement of the present invention, an exchange of data between different zones includes the following steps: copying the data to the first buffer storage area assigned to the first zone; checking and/or validating the copied data; and, as a function of the checking and/or validation, copying the data from the first buffer storage area assigned to the first zone to the second buffer storage area assigned to the second zone.

In particular, the security may be increased further by the validation of the incoming data. Due to the selected concept, including the buffer memories with high security against manipulation, the rate of data exchange may be increased. In addition, the concept also allows the non-trustworthy zone to be monitored, by using, to this end, monitoring mechanisms for monitoring the trustworthy zone. It is particularly preferable for data to be written from the first buffer storage area to the exchange buffer storage area. It is particularly advantageous for the data located in the exchange buffer storage area to be checked, in particular, by the further program, in connection with write access; and, upon the successful checking of the data, for the data to be copied from the exchange buffer storage area to the second buffer storage area. Consequently, zones may be clearly separated, so that no corrupted data reach the trustworthy zone. The security is increased further by preventing executive access to data in each of the buffer storage areas and/or in the exchange buffer storage area. Thus, in general, the data may only be used after verification. This increases the security further.

In accordance with an example embodiment of the present invention, it is particularly advantageous for a method to be provided for operating a computing device having at least one processor core, in particular, for an embedded system and/or a control unit, in particular, for a vehicle, especially a motor vehicle; the method including the following steps: Assigning one or more programs executable by the computing device, in particular, application programs or subroutines, to one of at least two zones, the zones characterizing resources, which are usable for executing a relevant application program; optionally executing at least one of the programs, in particular, application programs or subroutines, as a function of the zone assigned to it; the method further including: Using a supervisor for allocating computing time resources for different programs, in particular, application programs and/or instances of application programs; the supervisor and/or a functionality corresponding to the supervisor being implemented at least partially with the aid of a supervisor instance, which is independent of the at least two zones.

Additional features, uses and advantages of the present invention are derived from the following description of exemplary embodiments of the present invention, which are represented in the figures. In this context, all of the described or illustrated features form the subject matter of the present invention, either alone or in any combination, irrespective of their wording and representation in the description and in the figures, respectively.

BRIEF DESCRIPTION OF THE DRAWINGS

FIGS. 20 and 21 show, in each instance, a schematic flow chart according to further preferred specific embodiments of the present invention.

DETAILED DESCRIPTION OF EXAMPLE EMBODIMENTS

Figure 1:
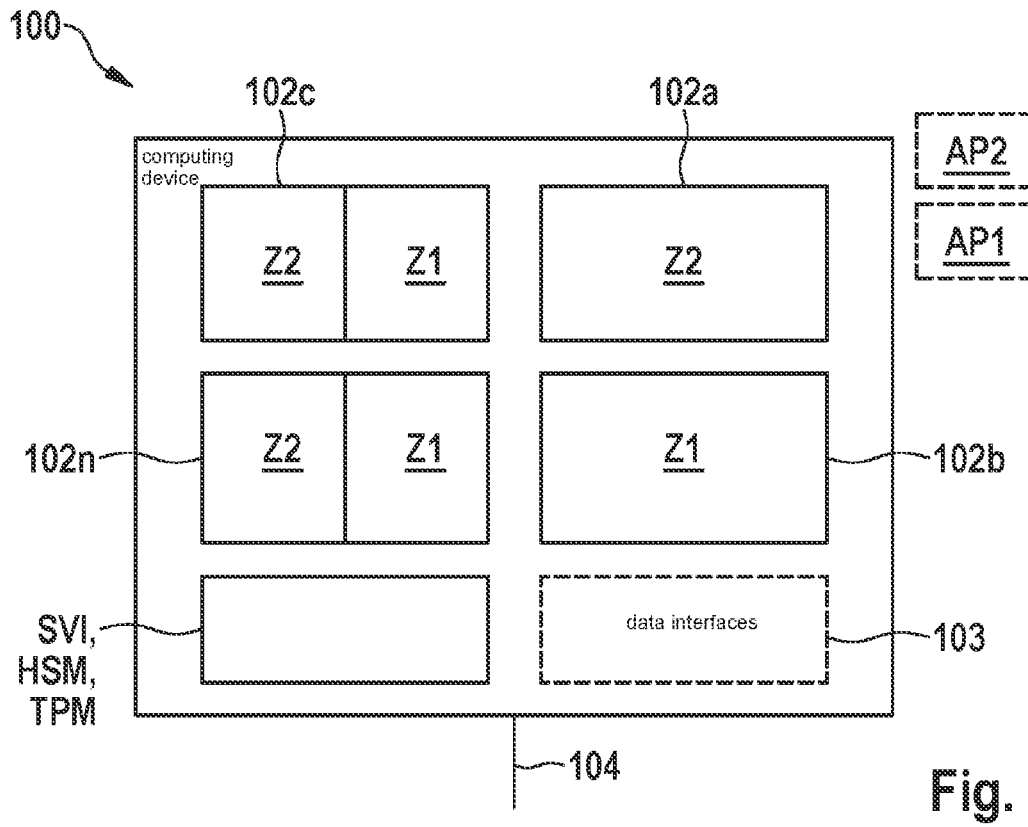
FIG. 1 shows a schematic, simplified block diagram of a computing device according to preferred specific embodiments of the present invention.

FIG. 1 schematically shows a simplified block diagram of a computing device 100 according to preferred specific embodiments. Computing device 100 includes at least one processor core, presently, four processor cores 102*a*, 102*b*, 102*c*, 102*n* by way of example, and may be used, in particular, e.g., for an embedded system and/or a control unit, in particular, for a vehicle, especially a motor vehicle.

Figure 2A:
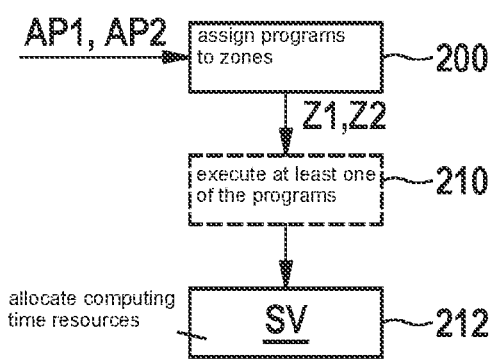
FIG. 2A shows a schematic, simplified flow chart of a method according to further preferred specific embodiments of the present invention.

Preferred specific embodiments relate to a method for operating computing device 100, which includes the following steps, cf. the flow chart of FIG. 2A: Assigning 200 one or more programs executable by computing device 100 (FIG. 1), in particular, application programs AP1, AP2 and/or subroutines and/or proxies and/or instances, to one of at least two zones Z1, Z2; zones Z1, Z2 characterizing resources of computing device 100, which are usable for executing a relevant program, in particular, application program AP1, AP2 and/or subroutine and/or proxies and/or instances of an application program AP1, AP2; optionally executing 210 at least one of the programs, in particular, application programs AP1, AP2 and/or subroutines and/or proxies and/or instances, as a function of the zone Z1, Z2 assigned to it. Optionally, the method further includes: Using 212 a supervisor SV for allocating computing time resources for different programs, in particular, application programs and/or instances of application programs; supervisor SV and/or a functionality corresponding to supervisor SV being implemented at least partially with the aid of a supervisor instance SVI (FIG. 1), which is independent of the at least two zones Z1, Z2. This advantageously permits an increase in the security of the operation of computing device 100, without affecting the operational flexibility during the execution of programs, in particular, application programs AP1, AP2, subroutines, proxies, instances, etc.

In further preferred specific embodiments, this allows, e.g., trust boundaries to be defined, e.g., between trustworthy and non-trustworthy instances/units/domains. In this manner, for example, first programs, in particular, application programs and/or subroutines and/or proxies and/or instances, may be assigned to a non-trustworthy, first zone NTZ for the computing device, and second programs, in particular, application programs and/or subroutines and/or proxies and/or instances, may be assigned to a trustworthy, second zone TZ for the computing device.

Figure 2B:
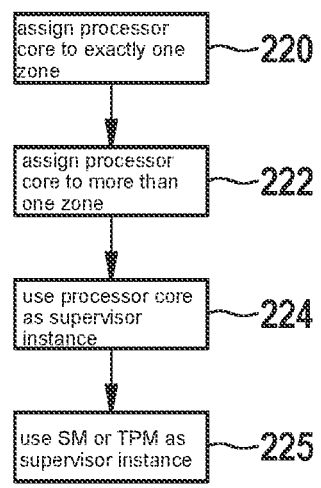
FIG. 2B through 2W show, in each instance, a schematic, simplified flow chart of a method according to further preferred specific embodiments of the present invention.

In further preferred specific embodiments, computing device 100 (FIG. 1) includes a plurality of (e.g., four) processor cores 102*a*, 102*b*, 102*c*, 102*n*, as illustrated in FIG. 1 by way of example; the method further including, cf. FIG. 2B: a) assigning 220 at least one processor core to exactly one zone; and/or b) assigning 222 at least one processor core to more than one zone, in particular, to two zones; c) using 224 at least one processor core as a supervisor instance SVI, in particular, using the at least one processor core as a dedicated supervisor instance SVI; d) using 225 at least one hardware security module HSM and/or trusted platform module TPM as a supervisor instance SVI.

In further preferred specific embodiments, for example, first processor core 102*a* is assigned to a first zone Z1, which may constitute, e.g., a non-trustworthy zone, and second processor core 102*b* is assigned to a second zone Z2, which may constitute, e.g., a trustworthy zone.

In further, preferred specific embodiments, for example, third processor core 102*c* is assigned to both first zone Z1 and second zone Z2, see FIG. 1. In further preferred specific embodiments, something comparable may also apply to fourth processor core 102*n* of computing device 100.

In further preferred specific embodiments, computing device 100 according to FIG. 1 may also have other components not specified in detail in FIG. 1, such as one or more storage devices and/or peripheral components, which, for the sake of clarity, are indicated together in FIG. 1 with the aid of dashed rectangle 103. Reference numeral 104 symbolizes one or more data interfaces.

Figure 25:
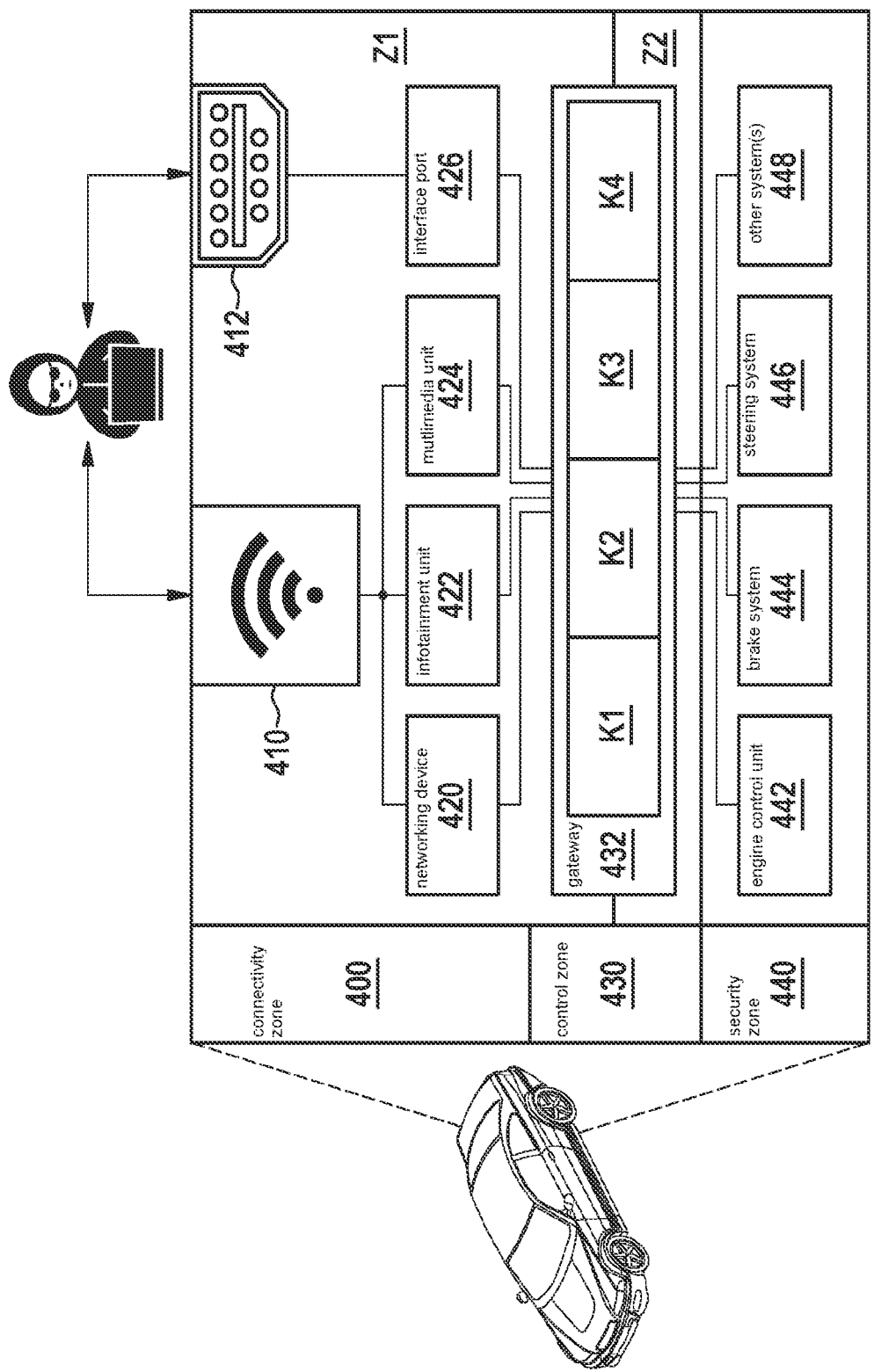
FIG. 25 shows a simplified block diagram of the integration of the device in a motor vehicle, according to example embodiments of the present invention.

Non-trustworthy zone Z1 includes components/control units in a motor vehicle in a connectivity zone 400, cf. FIG. 25. In this connection, data may be exchanged, for example, via a wireless interface 410 (for example, with the aid of mobile radio communication, WLAN, Bluetooth, etc.) or a wired interface 412 (easily accessible with physical connectivity), such as a diagnostic interface (OBD) having a corresponding interface port 426. For example, a so-called connectivity control unit, that is, a device for networking outside of the vehicle 420, an infotainment unit 422, a multimedia unit 424, etc., are included as possible components in connectivity zone 400. Such functions of the motor vehicle, which are distinguished, first of all, by the exchange of data with devices outside of the vehicle, but do not include, secondly, safety-related functions, which are absolutely necessary for driving the motor vehicle, are settled in this connectivity zone 400. It relates to, in particular, components having a lower safety classification, such as ASIL classification QM or ASIL-A according to ISO 26262, an ISO standard for safety-related systems in motor vehicles.

Such safety-related functions, which are absolutely necessary to drive the motor vehicle, are settled in security zone 440. This functional security zone 440 is used, in particular, for the protection of passengers and the environment. This security zone 440 includes all of the components/control units having strict requirements with regard to functional reliability (engine control unit, steering system, brakes, . . . ). All of the data coming out of trustworthy zone Z2 are preferably rated directly as trustworthy without further input validation. For example, the components of safety zone 440 may be engine control unit 442, brake system 444, steering system 446, etc. There are strict safety requirements for the components of security zone 440. These include safety requirements, as classified in the ISO standard ISO26262, from ASIL-B to ASIL-D in the safety classification according to ISO26262.

A control zone 430 is provided as a connecting element, in particular, for exchanging data between security zone 440 and connectivity zone 400. Control zone 430 is implemented by a gateway 432, in which the described functions are implemented. Control zone 430 is characterized by targeted monitoring of the communication between connectivity zone 400 and security zone 440. In particular, the zone separation between trustworthy zone Z2 and non-trustworthy zone Z1, with the corresponding exchange of data and monitoring mechanisms, is established there, in particular, by memory protection device SSE or supervisor SV. The corresponding interaction between connectivity zone 400 and functional security zone 440 takes place.

It is particularly preferable for interfaces 410, 412, resources, running time, and privileges to be distributed to zones (security-related zone Z2, non-security-related zone Z1). Interfaces 410, 412 may be physically separated bus systems or logical diagnostic interfaces. Storage devices 1030, 1030*a*, program memory, data storage units, and data buffers and/or buffer memories count as the resources. The running time includes separate tasks or else the provision of separate communication proxies and/or instances (subroutines, for example, in connection with the splitting-up of the protocols among zones Z1, Z2; these proxies and/or subroutines are used only for carrying out communication). In addition, separate application proxies and/or instances (subroutines, which change the data and/or access these data to execute application programs, e.g., for connected services, remote door unlock, remote parking), may be provided as programs. For example, privileged operating modes count towards the privileges. Thus, for example, a special mode may be provided for first zone Z1, as may be implemented, e.g., for memory protection device SSE, using the configuration data. In addition, a special mode may be provided for second zone Z2, as may be implemented likewise, for example, for memory protection device SSE, using the configuration data. In addition, a supervisor and/or supervisor instance SVI, which is again represented, using the configuration data, may be provided for memory protection device SSE, for shifting between the above-mentioned modes for the two zones Z1, Z2. In this connection, a one-time static and authentic configuration of memory protection device SSE is carried out. The basic procedure for this is described below in further detail.

In further preferred specific embodiments, supervisor instance SVI may be made up of, e.g., a (dedicated) processor core and/or a hardware security module HSM and/or a trusted platform module TPM; and/or the functionality of supervisor instance SVI may be implemented with the aid of at least one of these elements.

Figure 3:
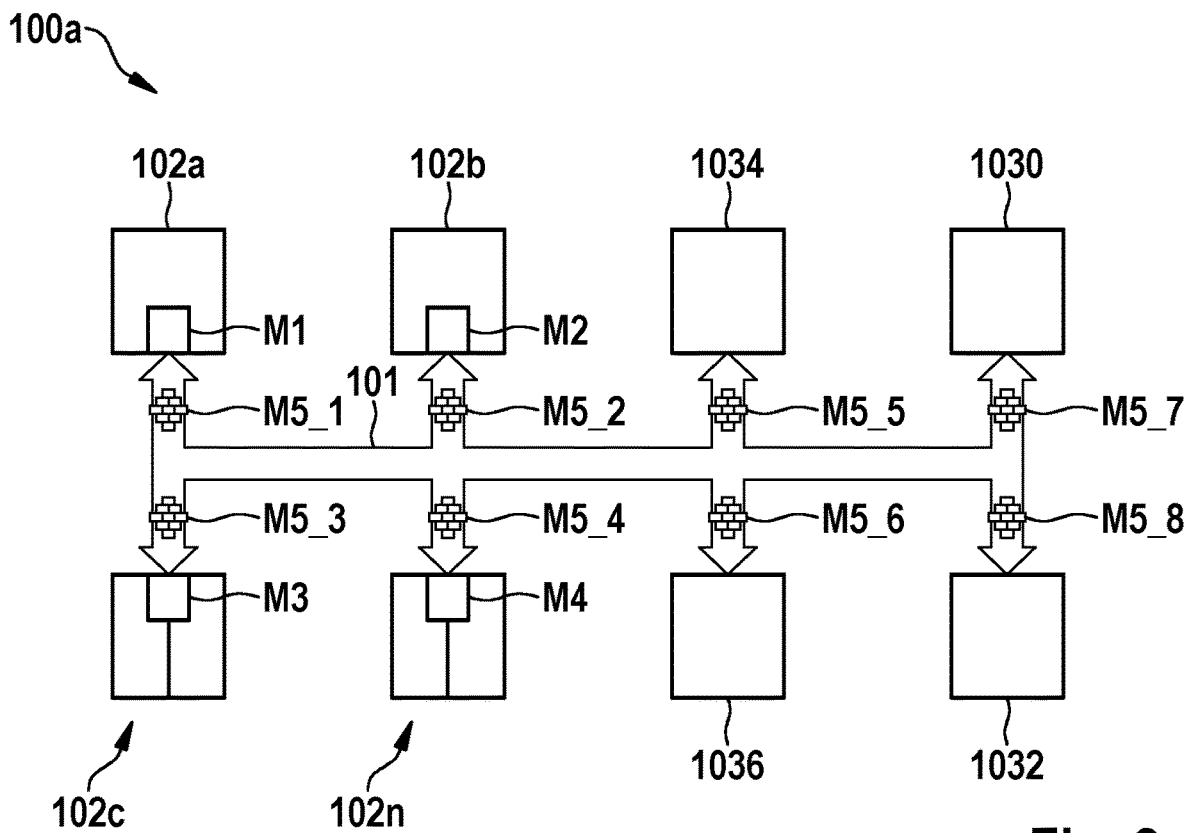
FIG. 3 shows a schematic, simplified block diagram of a computing device according to further preferred specific embodiments of the present invention.

FIG. 3 schematically shows a simplified block diagram of a computing device 100*a* according to further preferred specific embodiments, which includes four processor cores 102*a*, 102*b*, 102*c*, 102*n* in a manner comparable to the computing device 100 according to FIG. 1. A working memory (RAM) 1030, a nonvolatile memory 1032 (e.g., flash memory, in particular, flash EEPROM), as well as special function registers 1034 of computing device 100*a* optionally present, as are usable, e.g., for controlling the operation of peripheral components of it, are shown in FIG. 3, as well. Components 102*a*, 102*b*, . . . , 1034 are interconnected among each other by a bus system 101.

Figure 2C:
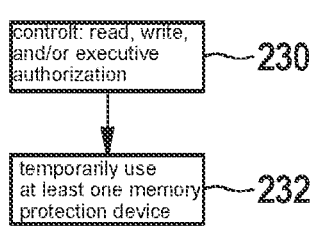

In further preferred specific embodiments, the method for operating computing device 100 (FIG. 1), 100*a* (FIG. 3) further includes, cf. FIG. 2C: Controlling 230, in particular, limiting, at least one of the following elements: a) read authorization in storage devices 1030, 1032 assigned to computing device 100, 100*a*; b) write authorization in storage devices 1030, 1032 assigned to the computing device; c) executive authorization (execution authorization) in storage devices 1030, 1032 assigned to the computing device, as a function of at least one zone Z1, Z2. In this manner, it is advantageously ensured that only such programs, in particular, application programs AP1, AP2 (FIG. 1), subroutines, etc., obtain access to the above-mentioned storage device(s) 1030, 1032, which are assigned to a corresponding zone Z1, Z2. Therefore, for example, in further preferred specific embodiments, a program, in particular, application program, subroutine, proxy, of a non-trustworthy zone may be prevented from accessing storage device(s) 1030, 1032 (in particular, e.g., access by the non-trustworthy zone to the storage area 1030, 1032 assigned to the trustworthy zone), which possibly constitutes a risk of possible manipulation of the storage device contents by programs of the non-trustworthy zone.

In further preferred specific embodiments, the method also includes, cf. FIG. 2C: At least temporarily using 232 at least one memory protection device M1, M2, M3, M4, M5_1, M5_2, M5_3, M5_4, M5_5, M5_6, M5_7, M5_8 (FIG. 3) for controlling the read authorization and/or write authorization and/or executive authorization.

Figure 2D:
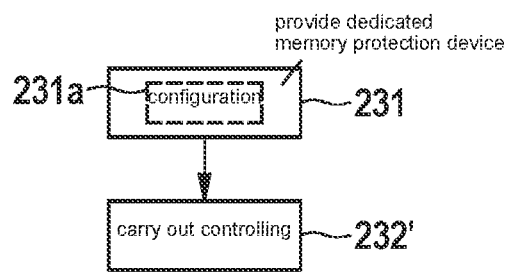

In further preferred specific embodiments, the method further includes, cf. FIG. 2D: Providing 231 at least one dedicated memory protection device M1 for at least one processor core 102*a*; in each instance, a dedicated memory protection device M1, M2, M3, M4 being provided, in particular, for a plurality of, preferably all of, processor cores 102*a*, 102*b*, 102*c*, 102*n*. In further preferred specific embodiments, the respective (dedicated) memory protection device M1, M2, M3, M4 may then be used, cf. step 232' from FIG. 2D, to carry out the above-mentioned controlling 230, in particular, limiting, of the above-mentioned access authorizations, in particular, read authorization and/or write authorization and/or the executive authorization.

In further preferred specific embodiments, the use 232' (FIG. 2D) may be preceded by an optional configuration 231*a* of the memory protection device(s).

Figure 2E:
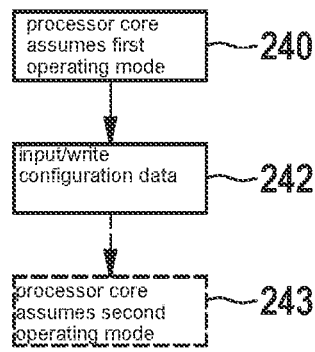

In further preferred specific embodiments, cf. FIG. 2E, at least one processor core 102*a* assumes a first operating mode at least temporarily, cf. step 240; in particular, in the first operating mode, the at least one processor core 102*a* inputting and/or writing 242 configuration data 1036 (FIG. 3), which control the operation of at least one memory protection device M1, M2, . . . , M5_8; in particular, the at least one processor core 102*a* assuming a second operating mode 243 at least temporarily, in which it may not write and/or change the configuration data for the at least one memory protection device M1, M2, . . . , M5_8.

In further preferred specific embodiments, the first operating mode may also be referred to as supervisor mode and/or monitoring mode. Consequently, the supervisor mode and/or monitoring mode may constitute a privileged state, in which the processor core 102*a* in question may take on a configuration of the at least one memory protection device M1, M2, . . . , M5_8.

In further preferred specific embodiments, the configuration data for the at least one memory protection device M1, M2, . . . , M5_8 may be provided, e.g., in the form of special function registers (SFR), in particular, configuration registers 1036, which are optionally accessible at least temporarily via bus system 101, as well, preferably under the control of a corresponding memory protection device M5_6. In other words, in further preferred specific embodiments for the configuration data of the at least one memory protection device M1, M2, . . . , M5_8, e.g., special function registers (SFR), in particular, configuration registers 1036, are provided.

In further preferred specific embodiments, cf. FIG. 2E, the at least one processor core 102a assumes 240 the first operating mode in an event-driven manner, in particular, as a function of at least one interrupt request.

Figure 2F:
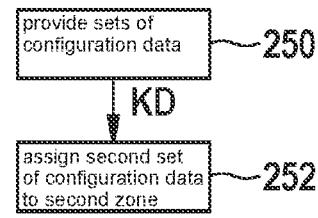

In further preferred specific embodiments, the method further includes, cf. FIG. 2F: providing 250 a plurality of sets of configuration data KD for the at least one memory protection device M1, M2, . . . , M5_8; in particular, at least one first set of the plurality of sets of configuration data KD being assigned to a first zone Z1 of the at least two zones, and at least one second set of the plurality of sets of configuration data KD being assigned to a second zone Z2 of the at least two zones, cf. step 252.

In further preferred specific embodiments, in the scope of dedicated system states, such as in a start cycle, and/or in response to certain events, such as upon entrance into an interrupt routine (interrupt service routine, ISR), at least one processor core 102a assumes a particular operating mode, such as the supervisor mode, which may take place in a hardware-controlled manner.

In further preferred specific embodiments, at least one further, non-privileged operating mode is provided for one or more, preferably all, processor cores (non-privileged mode), which may also be referred to as user mode in further preferred specific embodiments. In the user mode, configuration data KD, 1036 are preferably not writeable for the at least one memory protection device M1, M2, . . . , M5_8. In other words, in further preferred specific embodiments, a processor core, which is presently in the user mode, may not write and/or change configuration data KD, 1036 for the at least one memory protection device M1, M2, . . . , M5_8; whereas a processor core, which is presently in the supervisor mode, may write and/or change configuration data KD, 1036 for the at least one memory protection device M1, M2, . . . , M5_8.

In further preferred specific embodiments, application programs AP1, AP2 are executed in a non-privileged mode, e.g., in the user mode.

In further preferred specific embodiments, e.g., three operating modes and/or operating states and/or modes may be provided, e.g.: first, a supervisor mode, second, a "user mode 1," in particular, for non-trustworthy zone(s), third, a "user mode 2," in particular, for trustworthy zone(s).

In further preferred specific embodiments, e.g., in user mode 1, static configuration data KD2 may be active, and, e.g., a first application program AP1 is running.

In further preferred specific embodiments, e.g., in user mode 2, static configuration data KD3 may be active, and, e.g., a second application program AP2 is running.

In further preferred specific embodiments, e.g., static configuration data KD1 are active in the supervisor mode; e.g., the supervisor mode being used (as an option, only) for switching over between static configuration data KD2 and static configuration data KD3.

In further preferred specific embodiments, the user modes 1 and 2 are not able to switch over between static configuration data KD1, KD2, KD3, KD4.

In further preferred specific embodiments, e.g., (only) two modes (e.g., supervisor mode and user mode) may also be provided. Therefore, in further preferred specific embodiments, e.g., the supervisor mode may be assigned to the trustworthy zone and, e.g., may carry out the switchover between configuration data KD1 and configuration data KD2 and, e.g., possibly execute second application program AP2.

In further preferred specific embodiments, for different operating modes and/or operating states (e.g., privileged and non-privileged mode and/or supervisor mode, user mode), specific read and/or write and/or execution authorizations, e.g., in storage devices 1030, 1032, are allocated for the specific operating mode, which may be implemented in further preferred specific embodiments, e.g., by providing different sets of configuration data KD (configuration data sets).

In further preferred specific embodiments, for different combinations of operating mode(s) having respective application programs, read and/or write and/or execution authorizations are assigned in a manner specific to the operating mode and/or specific to the application, which may likewise be implemented, e.g., in further preferred specific embodiments, by providing different sets of configuration data KD (configuration data sets). For example, for different application programs AP1, AP2 (FIG. 1), read and/or write and/or execution authorizations each adapted to the respective application program AP1, AP2 may be assigned, e.g., for the user mode.

In further preferred specific embodiments, one or more, preferably, all of the memory protection devices M1, M2, . . . , M5_8 mentioned above by way of example, have a plurality of configuration data sets, which, in further preferred specific embodiments, may preferably be assigned to different modes and application programs AP1, AP2 in an efficient manner.

In further preferred specific embodiments, e.g., in response to a change between privileged or non-privileged modes (e.g., a change from supervisor mode to user mode, or vice versa) or between application programs, in particular, in a non-privileged mode, a switchover may be made efficiently, in particular, in a hardware-controlled manner, between the configuration data sets for the respective modes and/or operating modes.

Figure 23:
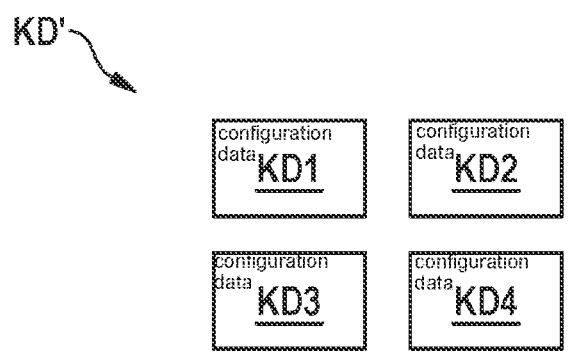
FIG. 23 shows schematic, simplified block diagram of configuration data according to further preferred specific embodiments.

In further preferred specific embodiments, computing device 100, 100a (FIG. 3) includes, for example, the configuration options illustratively mentioned below: a) a, in particular, static (unchangeable) configuration data set for at least one central memory protection device and/or at least one memory protection device M5_1, . . . , M5_8 assigned to bus system 101 (FIG. 3); b) in each instance, four, in particular, static, configuration data sets for dedicated memory protection devices M1, M2, M3, M4; in further preferred specific embodiments, each of these four configuration data sets for the dedicated memory protection devices including, e.g., a static configuration data set for the supervisor mode and, e.g., three static configuration data sets for application programs AP1, AP2, thus, e.g., for the user mode. FIG. 23 schematically shows an example of configuration data KD' including a total of four configuration data sets KD1, KD2, KD3, KD4.

In further preferred specific embodiments, the configuration data determine, e.g., the memory addresses, to which a component of the computing device, e.g., a processor core, has read and/or write and/or executive access. In further preferred specific embodiments, the memory protection device may be configured to instantaneously compare instances of access (read and/or write and/or executive) carried out by the processor core in question, to the contents of the configuration data; and, for example, in the case of agreement, to allow and/or forbid the respective instances of access, or vice versa.

In further preferred specific embodiments, the above-mentioned, preferably static configuration data sets for dedicated memory protection devices M1, M2, M3, M4 for the user mode may be correlated, e.g., with the zones Z1, Z2 according to the specific embodiments.

In further preferred specific embodiments, in particular, in the case of a so-called intercore zone separation, application programs of a particular zone Z2 (e.g., having the same trust level) are executed exclusively in a certain processor core 102a (FIG. 1). In further preferred specific embodiments, in particular, in the case of a dedicated memory protection device M1 (FIG. 3) for such a processor core 102a, e.g., only two, in particular, static, configuration data sets are used, e.g., one for the supervisor mode and one for application programs in the user mode. In further preferred specific embodiments, in particular, in the user mode, configuration data sets, which possibly remain, are unused up to now, and are for application programs, may be configured in such a manner, that they prevent general read, write, and executive access to the full memory 1030, 1032, which means that the security is increased further.

In further preferred specific embodiments, in particular, in the case of a so-called intracore zone separation, application programs of two zones Z1, Z2, having each, e.g., a different trust level, are executed in a certain processor core 102c (FIG. 1). In this case, two different static configuration data sets are preferably used for the programs and/or application programs of first zone Z1 and for the programs and/or application programs of second zone Z2, in particular, for the user mode; and a further, static configuration data set is preferably used for a further operating mode, e.g., the supervisor mode. In further preferred specific embodiments, in the supervisor-mode operating mode, processor core 102c is configured to take on the switching-over between the two static configuration data sets for the two zones Z1, Z2. Consequently, in further preferred specific embodiments, in the supervisor mode, processor core 102c may activate a configuration data set suitable for first zone Z1 in its dedicated memory protection device, if, e.g., a program assigned to first zone Z1, in particular, application program AP1 or subroutine or instance, is intended to be executed, and, e.g., may activate a configuration data set suitable for second zone Z2 in its dedicated memory protection device, if, e.g., a program assigned to second zone Z2, in particular, application program AP2 or subroutine or instance, is intended to be executed. In further preferred specific embodiments, in particular, in the user mode, configuration data sets (presently, a configuration data set, in the case of the total number of 4 pieces specified by way of example), which possibly remain, are unused up to now, and are for programs, may be configured, e.g., in such a manner, that they prevent general read, write, and executive access to the full memory 1030, 1032, which means that the security is increased further.

Figure 2G:
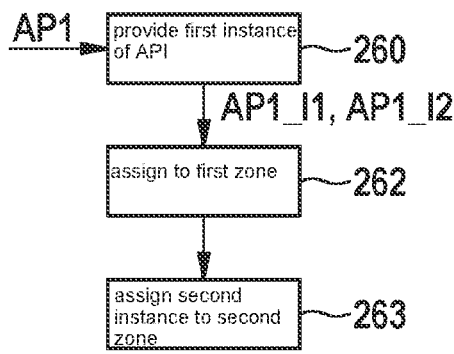

In further preferred specific embodiments, cf. FIG. 2G, the method further includes: Providing 260 a first instance AP1_I1 (and/or subroutine, proxy) of application program AP1 and a second instance AP1_I2 (and/or subroutine, proxy) of application program AP1; assigning 262 first instance AP1_I1 of application program AP1 to a first zone Z1 of the at least two zones; assigning 263 second instance AP1_I2 of application program AP1 to a second zone Z2 of the at least two zones. In this manner, application cases, in which an application and/or an application program AP1 "extends" over a plurality of zones Z1, Z2, may be advantageously uncovered. Consequently, in further preferred specific embodiments for this application program AP1, in each instance, one instance AP1_I1, AP1_I2 may be present per zone; in further preferred specific embodiments, such an instance also being able to be referred to as a proxy. In general, programs, such as application programs, which require data and/or generate data, as well as communications programs, which are used for data handling, may be understood as proxies, instances, subroutines, etc.

In further preferred specific embodiments, such a proxy AP1_I2 may cover relevant (partial) functionalities for the further zone Z2 in question. In further preferred specific embodiments, a proxy may optionally include a plurality of sub-components, as well.

In further preferred specific embodiments, computing device 100, 100a may implement, e.g., the following scenario: Should a first program, in particular, application program AP1, subroutine, receive data from a, e.g., non-trustworthy, first zone Z1, e.g., remote service requests from the Internet, and process these data accordingly or transmit them within trustworthy zone Z2, for example, to perform the corresponding service (remote service), then the data are received within first zone Z1 by the Z1 proxy AP1_I1 of application program AP1; the corresponding Z2 proxy AP1_I2 executing, e.g., the following steps: Data verification of the data, which are classified by the Z2 proxy AP1_I2, in particular, by default, as non-trustworthy; and, in the case of successful data verification, processing or transmitting of the data now classified as trustworthy (after the data verification) within second zone Z2.

Figure 2H:
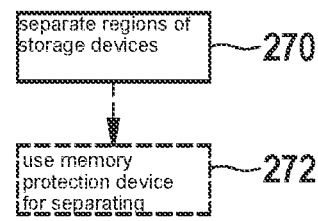

In further preferred specific embodiments, the method further includes, cf. FIG. 2H: Separating 270 regions of one of the storage devices 1030, 1032 assigned to computing device 100, 100a as a function of the at least two zones Z1, Z2; the storage device assigned to computing device 100, 100a including at least one of the following elements: a) buffer memory, in particular, in the form of working memory; b) stack; c) data storage unit; d) program memory; e) register memory; at least one memory protection device being used for the separating 270, cf. optional step 272.

Figure 2I:
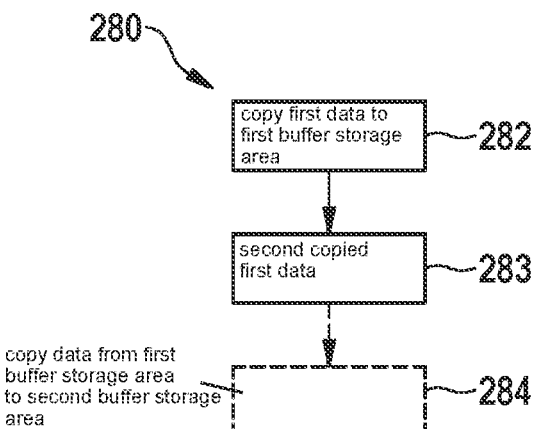

In further preferred specific embodiments, the method further includes, cf. FIG. 2I: Exchanging 280 first data between different zones via a buffer memory, in particular, working memory; in particular, the exchange of the first data between first zone Z1 and second zone Z2 including the following steps: Copying 282 the first data to a first buffer storage area TB1b, B3 assigned to the first zone; checking 283 the copied, first data; and, in particular, as a function of the checking, copying 283 the first data from the first buffer storage area TB1b, B3 assigned to first zone Z1 to a second buffer storage area TB2a, B1_2 assigned to second zone Z2. It is particularly preferable for the exchange of data to take place via an exchange buffer storage area TB1A (for the exchange of data from zone 1 Z1 to zone 2 Z2) and/or via an exchange buffer area TB2b (for the exchange of data from zone 2 Z2 to zone 1 Z1).

Figure 4:
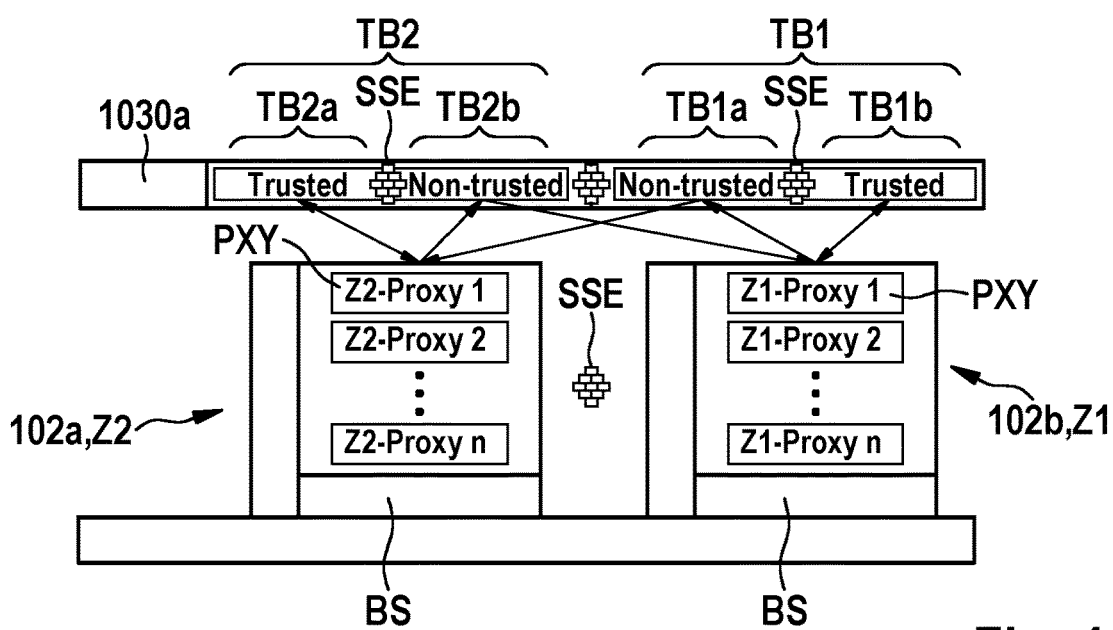
FIGS. 4 and 5 show, in each instance, a schematic, simplified block diagram of aspects according to further preferred specific embodiments of the present invention.

FIG. 4 schematic shows a simplified block diagram of aspects of computing device 100, 100a according to further preferred specific embodiments. Illustrated, are the two processor cores 102a, 102b, which are assigned to the specific zones Z1, Z2, as already described above. An area of working memory 1030 (FIG. 3) is presently usable as a buffer memory (that is, as the buffer storage areas described below (first buffer storage area TB1b, B3; second buffer storage area TB2a, B1_2; exchange buffer storage area TB1a, TB2b, B3)) and/or "divided working memory," in particular, for exchanging data between different zones Z1, Z2 and/or between the respective processor cores 102a, 102b and/or (instances of) application programs executable in them; a first subregion TB1 being assigned to first zone Z1, that is, to second processor core 102b; and a second subregion TB2 being assigned to second zone Z2, that is, to first processor core 102a.

A plurality of proxies PXY are illustrated in FIG. 4, as well; e.g., a first quantity of proxies Z1-Proxy 1, Z1-Proxy 2, . . . , Z1-Proxy n being assigned to first zone Z1, thus, in this case, to processor core 102b; and, e.g., a second quantity of proxies Z2-Proxy 1, Z2-Proxy 2, . . . , Z2-Proxy n being assigned to second zone Z2, thus, in this case, to processor core 102a. At present, a plurality of memory protection devices SSE and/or functional components of them, which indicate, in FIG. 4, a corresponding separation of subregions TB1, TB2 and/or of zones Z1, Z2 from each other and/or among each other in accordance with the principle shown in preferred specific embodiments, are designated by reference character SSE.

Different buffer storage areas, which are provided with different reference characters as a function of the figure, are used for exchanging data: First buffer storage area TB1b, B3; second buffer storage area TB2a, B1_2; exchange buffer storage area TB1a, TB2b, B3".

For example, in order to transport data from first zone Z1 (transmitting zone) to trustworthy, second zone Z2 (receiving zone) in a secure manner, different buffer storage areas of memory 1030, 1032 are provided.

Thus, a first buffer storage area TB1b, B3' is provided for first, that is, transmitting zone Z1. Transmitting and/or first zone Z1 and/or the first program assigned to non-trustworthy zone Z1, in particular, application program AP1, subroutine, etc., has the following access rights implemented by memory storage device SSE: read, write, not: executive. Receiving and/or second zone Z2 and/or the second program assigned to trustworthy zone Z2, in particular, application program AP2, subroutine, etc., does not have any authorizations implemented by memory protection device SSE, to access first buffer storage area TB1b, B3', that is, neither read, nor write, nor executive.

A second buffer storage area TB2a, B1_2 is provided for second, that is, receiving zone Z2. Receiving and/or second zone Z2 and/or the second program assigned to trustworthy zone Z2, in particular, application program AP2, subroutine, etc., has the following access authorizations implemented by memory protection device SSE: read, write, not: executive. Transmitting, that is, first zone Z1, and/or the corresponding, first program, does not have any access authorizations implemented by memory protection device SSE, that is, neither read, nor write, nor executive.

An exchange buffer storage area TB1a, TB2B, B3" is provided for transferring data from transmitting and/or first zone Z1 to receiving and/or second zone Z2. Transmitting and/or first zone Z1 and/or the first program possesses the following authorizations to access exchange buffer storage area TB1a, TB2b, B3", implemented by memory protection device SSE: write. Transmitting and/or second zone Z2 and/or the second program possesses the following access rights to exchange buffer storage area TB1a, TB2b, B3", implemented by memory protection device SSE: read.

The following procedure results for the exchange of data between transmitting zone Z1 and receiving zone Z2 and use or transmission in receiving zone Z2. First, the data from first buffer storage area TB1b, B3' are written by transmitting zone Z1 to exchange buffer storage area TB1a, TB2b, B3". The data are subsequently validated by receiving zone Z2, using read access to exchange buffer storage area TB1a, TB2b, B3" (check of the validity). If the data are valid, they are rated by receiving zone Z2 as trustworthy and copied to second buffer storage area TB2a, B1_2 for receiving zone Z2. The further use and transmission of trustworthy data takes place in receiving zone Z2, starting from second buffer storage area TB2a, B1_2 for receiving zone Z2.

The method described must be used for the transfer of data from non-trustworthy zone Z1 to trustworthy zone Z2. This procedure is optional in the other direction (transfer of data from trustworthy zone Z2 to non-trustworthy zone Z1). For the transfer of data from trustworthy zone Z2 to non-trustworthy zone Z1, the above-described, secure method also provides an optional, additional exchange buffer memory TB2b, B1_1, to which a program of trustworthy zone Z2 only has write access and receiving zone Z1 only has read access. Otherwise, the method of exchange proceeds analogously, as described.

As already described, the management of the authorizations (regarding read authorization, write authorization, executive authorization) to access the buffer memories (first buffer storage area TB1b, B3; second buffer storage area TB2a, B1_2; exchange buffer storage area TB1a, TB2b, B3") is carried out by memory protection device SSE. For all three types of buffers (first buffer storage area TB1b, B3'; second buffer storage area TB2a, B1_2; exchange buffer storage area TB1a, TB2b, B3"), the execution authorizations for each zone Z1, Z2 should be eliminated. The configuration of memory protection device SSE and, consequently, of the authorizations to access the specific types of buffers, and the assignment of zones Z1, Z2, take place statically and authentically at the booting operation. This means that no change in the configuration at the running time, and/or after the first configuration after the booting, is possible.

Any access to one of the buffers (first buffer storage area TB1b, B3'; second buffer storage area TB2a, B1_2; exchange buffer storage area TB1a, TB2b, B3") always takes place via memory protection device SSE. This means that any invalid access request by a zone Z1, Z2 is prevented by memory protection device SSE (for example, an instance of write access by first zone Z1 to second buffer storage area TB2a, B1_2 of second zone T2, for example, in the case of a buffer overflow).

Figure 2J:
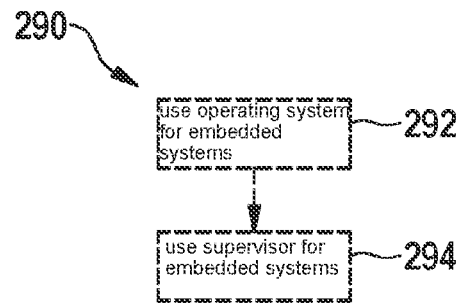

In further preferred specific embodiments, cf. FIG. 2J, the method further includes: Separating 290 computing time resources for different application programs AP1, AP2 and/or instances of application programs, in particular, allocating computing time resources for different application programs and/or instances of application programs, as a function of the at least two zones Z1, Z2.

In further preferred specific embodiments, the method additionally includes: Use 292 of an operating system BS for embedded systems, in particular, of a light-weight embedded operating system BS, to allocate computing time resources for different application programs AP1, AP2 and/or instances AP1_I1, AP2_I2 of application programs; in particular, in each instance, a processor core of computing device 100, 100a being assigned an operating system BS, see FIG. 4.

Figure 5:
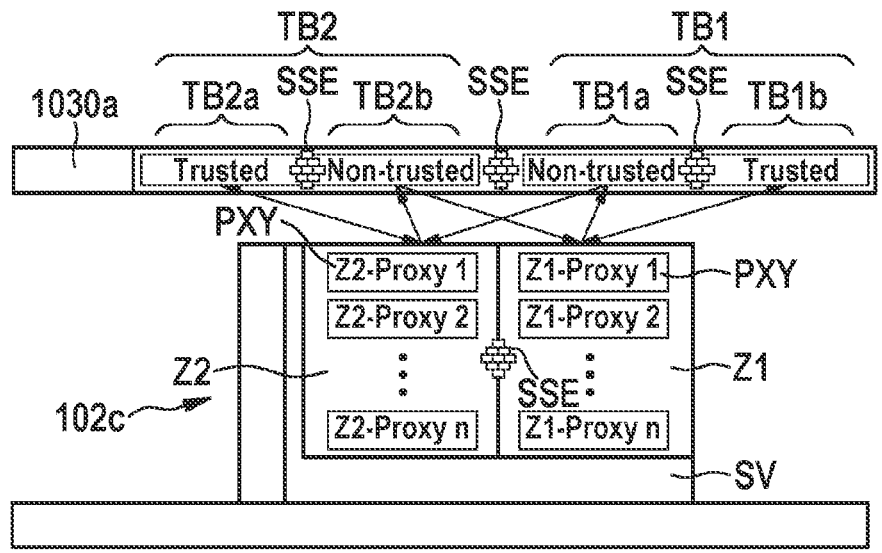

In further preferred specific embodiments, as an alternative to, or in addition to, step 292 of FIG. 2J, the method further includes: Using 294 a supervisor SV for embedded systems, cf. FIG. 5, in particular, a lightweight embedded supervisor SV, to allocate computing time resources for different application programs and/or instances of application programs; in particular, in each instance, a processor core 102c (FIG. 5) of the computing device being assigned a supervisor SV.

In further preferred specific embodiments, operating system BS and/or supervisor SV allocates computing time resources, preferably, only for predefined tasks (application programs and/or instances of application programs and/or parts of them), in particular, using a static (unchangeable) task list. In other words, in further preferred specific embodiments, only scheduling of predefined tasks is possible, which further increases the security.

In further preferred specific embodiments, operating system BS (FIG. 4) and/or supervisor SV (FIG. 5) allocates computing time resources as a function of a) repeated, in particular, periodically repeating interrupt requests (e.g., from clock interrupts), and/or b) event-driven interrupt requests; in particular, tasks being activated by at least one interrupt routine (interrupt service routine, ISR, a computer program, which is executed in response to the occurrence of an interrupt request).

In further preferred specific embodiments, upon the commencement of an interrupt routine, configuration data for at least one memory protection device M1, M2, . . . , SSE are changed, in particular, in a hardware-controlled manner.

In further preferred specific embodiments, the lightweight embedded OS BS (FIG. 4) or the lightweight embedded supervisor SV (FIG. 5) may coordinate and/or orchestrate (proxy) functionalities (tasks) to be executed, e.g., in a cyclical or event-driven manner (scheduling).

In further preferred specific embodiments, lightweight embedded OS BS, as well as the lightweight embedded supervisor, have, in particular, at least one of the following characteristics:
a) Minimizing attack surface by reducing complexity (scope of code, functionality, flexibility, etc.) to a necessary minimum;
b) Scheduling exclusively predefined tasks (static task list, no dynamic task list possible), scheduling based on, e.g., ISR including, e.g., cyclical interrupt requests (IRQ), e.g., timer IRQ and/or event-based IRQ's, e.g., Rx (receiving) IRQ, Tx (transmitting) IRQ, SW (software) IRQ, etc. tasks are activated by ISR;
c) Upon entry into ISR, a hardware-controlled switchover into the supervisor mode is preferably carried out: e.g., switchover to static configuration data set for the supervisor mode, a shift between static configuration data sets (e.g., for user modes) is preferably possible exclusively in supervisor mode;
d) It is further preferable for a switchover from the supervisor mode to the user mode to occur prior to the activation of a task; in particular, execution of tasks (e.g., parts of (instances of) application programs) taking place in the user mode; in addition, a switchover between (static) configuration data sets not being possible, in particular, in the user mode, that is, in tasks.
e) Advantageously, in further preferred specific embodiments, a static (and also, optionally, in particular, integral and authentic) configuration of the memory protection device(s), e.g., during a starting cycle, already implicitly prevents memory protection devices (e.g., lightweight embedded OS BS/supervisor SV) from being reconfigured dynamically, using an interrupt program (ISR) provided for the supervisor mode.

Figure 2K:
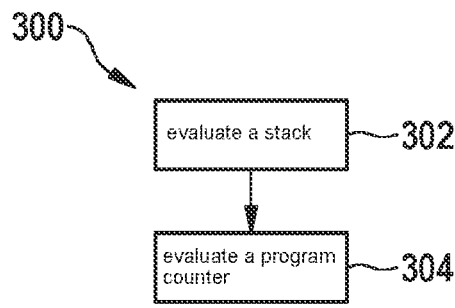

In further preferred specific embodiments, the method further includes, cf. FIG. 2K: In particular, with the aid of operating system BS (FIG. 4) and/or supervisor SV (FIG. 5), monitoring 300 at least one of the following elements, in particular, for potential compromise: a) first zone Z1; b) an application program AP1 assigned to first zone Z1; c) an instance AP1_I1 of an application program AP1, assigned to first zone Z1; in particular, monitoring 300 including: Evaluating 302 (FIG. 2K) a stack, and/or evaluating 304 a program counter (PC); the evaluation 302 of the stack and/or the evaluation 304 of the program counter preferably taking place prior to activation of the application program and/or the instance of the application program.

Figure 2L:
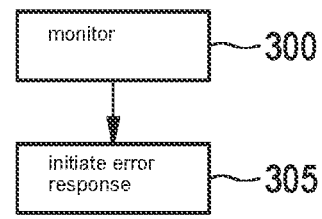

In further preferred specific embodiments, the method further includes, cf. FIG. 2L: Monitoring 300, see FIG. 2K above, and initiating 305 an error response, in particular, if the monitoring 300 indicates a potential compromise.

Figure 2M:
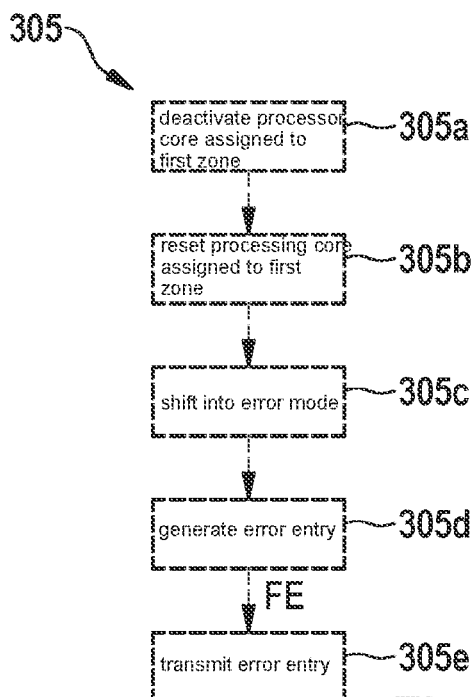

In further preferred specific embodiments, the error response, that is, the initiation 305 of the error response, includes at least one of the following elements, cf. FIG. 2M:
a) setting the first zone Z1 and/or the processor core 102b (FIG. 1) assigned to first zone Z1 to a secure state, in particular, by deactivating 305a the processor core 102b assigned to first zone Z1 and/or resetting 305b the processor core 102b assigned to first zone Z1 and/or shifting 305c it into an error mode; b) generating 305d an error entry FE; and/or c) transmitting 305e a/the error entry to an attack detection system, in particular, intrusion detection system. In further preferred specific embodiments, the IDS may be situated, e.g., internally and/or externally with respect to computing device 100, 100a.

In further preferred specific embodiments, e.g., the IDS may also be implemented in a distributed manner; e.g., first partial functionalities (such as, e.g., IDS sensors and, optionally, an IDS master) being implemented and/or executed in a/the computing device and/or at least one processor core of the computing device; and in particular, other parts and/or further partial functionality(ies) being optionally implemented in another device, e.g., a back end. In further preferred specific embodiments, the back end may also be configured, e.g., to implement at least one of the following aspects: a) in-depth expert analysis; b) artificial intelligence (KI); c) machine learning (ML), etc.

Figure 2N:
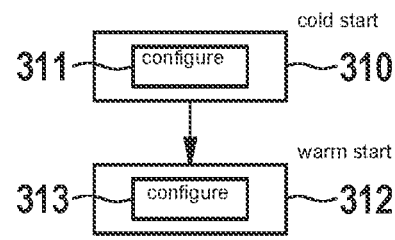

In further preferred specific embodiments, cf. FIG. 2N, computing device 100, 100a executes a cold start 310 at least intermittently; in particular, during the cold start 310, data and/or program code being loaded from a nonvolatile memory 1032 (FIG. 3); and computing device 100, 100a undertaking a warm start 312 (FIG. 2N) at least intermittently; in particular, during warm start 312, data and/or program code being loaded from a volatile memory 1030 (FIG. 3) powered at least intermittently; in particular, during cold start 310 (FIG. 2N), at least one memory protection device and/or the at least one memory protection device being configured, cf. step 311 from FIG. 2N; and/or, in particular, the at least one memory protection device being configured (also) during warm start 312, cf. step 313 from FIG. 2N.

In further preferred specific embodiments, only the processor core 102a, 102b, 102c, 102n, which has been provided a dedicated memory protection device M1, M2, M3, M4 (cf. step 231 from FIG. 2D), configures this dedicated memory protection device M1, M2, M3, M4 (step 231a from FIG. 2D).

Figure 2O:
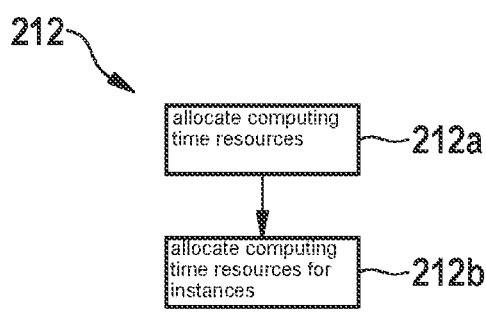

In further preferred specific embodiments, the method further includes, cf. FIG. 2O (numeral "2," letter "O"): Allocating 212a computing time resources for different application programs, and/or allocating 212b computing time resources for instances of application programs; the supervisor SV and/or a functionality corresponding to supervisor SV being implemented at least partially with the aid of supervisor instance SVI (FIG. 1).

Figure 2P:
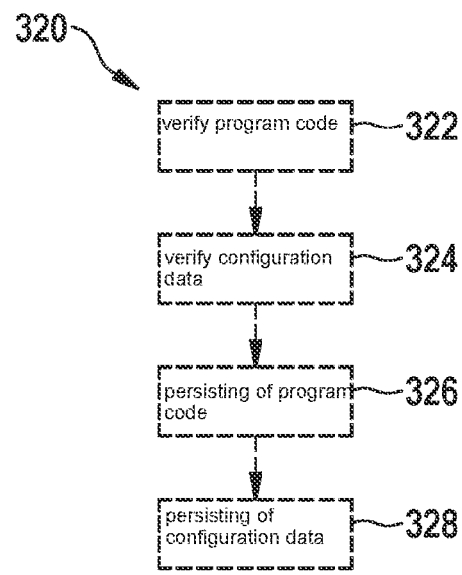

In further preferred specific embodiments, the method further includes, cf. FIG. 2P: Checking 320 an integrity and/or authenticity of configuration data KD, which control an operation of at least one memory protection device, in particular, with the aid of at least one of the following elements: a) verifying 322 a program code usable for configuring the at least one memory protection device; b) verifying 324 the configuration data; c) persisting 326 of a and/or the program code usable for configuring the at least one memory protection device; d) persisting 328 of the configuration data.

In further preferred specific embodiments, the persisting 326, 328 may include, e.g., providing the program code usable for configuring the at least one memory protection device and/or the configuration data in a read-only memory, such as a ROM or an OTP (one-time programmable memory).

Figure 2Q:
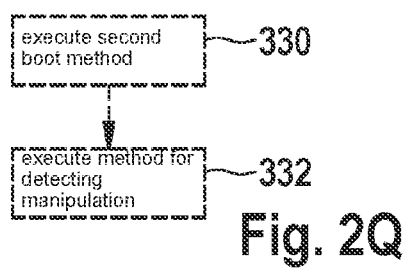

In further preferred specific embodiments, the method further includes, cf. FIG. 2Q: at least intermittently executing 330 a secure boot method and/or at least intermittently executing 332 a method for detecting manipulation during the running time (RTMD, run-time manipulation detection), in particular, using at least one processor core of computing device 100, 100a. Methods 330, 332 may include, for example, the comparison of the contents actually present, of at least a portion of storage device 1030, 1032 to specifiable, reference memory contents; the comparing also being able to include, for example, hash-value generation and/or use of CMAC (cipher-based message authentication code) methods and/or use of signatures and/or signed hash values.

Figure 2R:
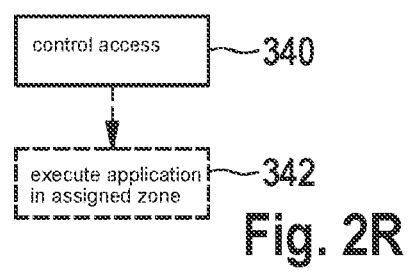

In further preferred specific embodiments, the method further includes, cf. FIG. 2R: controlling 340 access of a program and/or application program AP1, AP2 to at least one of the following elements as a function of at least one zone Z1, Z2: a) internal interface, in particular, software interface, of the computing device; b) internal and/or external hardware interface of the computing device; c) hardware security module and/or cryptographic module for executing cryptographic functions; d) peripheral devices of the computing device, in particular, special function registers of at least one peripheral device; e) internal interfaces of a target system for the computing device, in particular, of a control unit; f) external interfaces of a target system for the computing device, in particular, of a control unit; g) addressing elements for communications protocols, in particular, on at least one layer of the ISO/OSI layer model. Optional step 342 according to FIG. 2R indicates, by way of example, (further) execution of the relevant application program in the zone assigned to it.

Figure 2S:
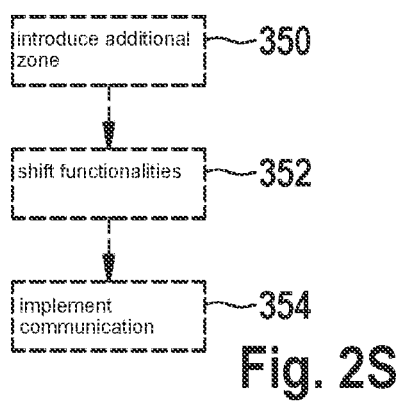
Figure 2T:
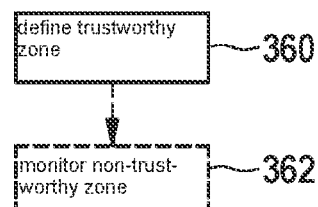

In further preferred specific embodiments, the method further includes at least one of the following elements, cf. FIG. 2S: a) introducing 350 at least one additional zone, in particular, one not already present; b) shifting 352 functionalities from a first processor core 102a to at least one further processor core 102b of computing device 100, 100a; c) implementing 354 communication between at least two zones, using a working memory integrated, in particular, in the computing device; d) defining 360, cf. FIG. 2T, at least one trustworthy zone and, optionally, monitoring 362 at least one further, in particular, non-trustworthy zone, using at least one application program assigned to the trustworthy zone.

With reference to FIGS. 6 through 21, further preferred specific embodiments, aspects, and advantages of the principal according to the specific embodiments are described below, which, according to further preferred specific embodiments, may each be combined individually, or in combination with each other, with at least one of the specific embodiments described above.

Figures 6, 7:
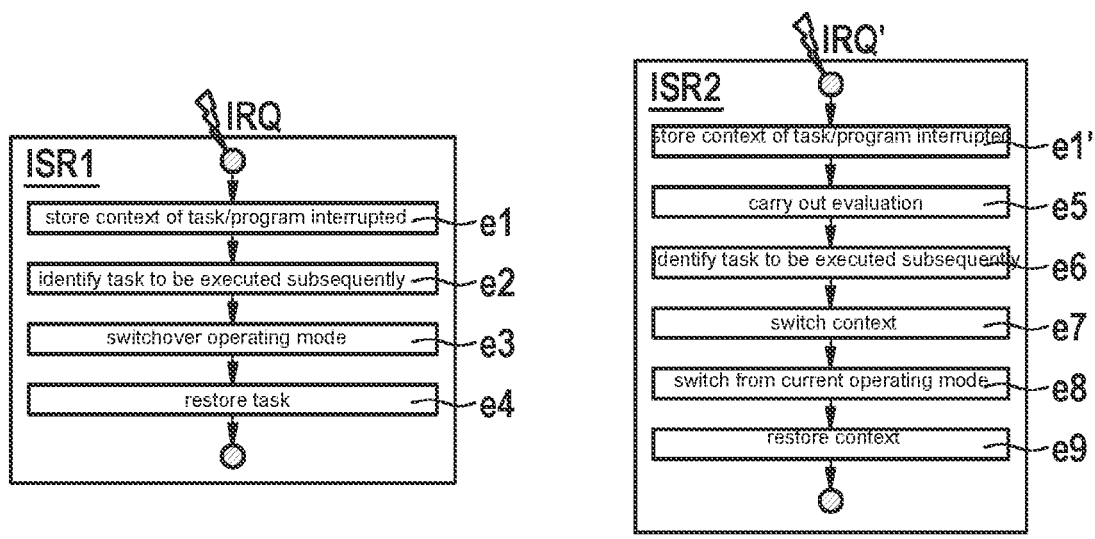
FIGS. 6 and 7 show, in each instance, schematic aspects of interrupt programs according to further preferred specific embodiments of the present invention.

FIG. 6 schematically shows aspects of an interrupt program ISR1 according to further preferred specific embodiments, as are executable, e.g., at least intermittently, by at least one processor core 102a, 102b, . . . of computing device 100, 100a. Lightning symbol IRQ in FIG. 6 symbolizes an occurring interrupt request, as may be generated, e.g., cyclically (e.g., specifiable by a timer chip (timer)), and/or in an event-driven manner (e.g., arrival of a message at a communications interface). Consequently, in further preferred specific embodiments, interrupt program ISR1, which includes at least one of the following elements, is executed: e1) at least temporarily storing a context of the task and/or program interrupted by interrupt request IRQ, e.g., in the stack (may be defined, e.g., in a specifiable area of RAM 1030); e2) identifying a task to be executed subsequently; e3) switching over from a current operating mode, e.g., supervisor mode, to another operating mode, e.g., user mode; e4) restoring the task for the identified zone.

In further preferred specific embodiments, interrupt program ISR1 shown in FIG. 6 may be used, for example, by operating system BS (FIG. 4), in particular, in the case of intercore zone separation.

FIG. 7 schematically shows aspects of an interrupt program ISR2 according to further preferred specific embodiments, as are executable, e.g., at least intermittently, by at least one processor core 102a, 102b, . . . of computing device 100, 100a.

Lightning symbol IRQ' in FIG. 7 symbolizes an occurring interrupt request, as may be generated, e.g., cyclically (e.g., specifiable by a timer chip (timer)), and/or in an event-driven manner (e.g., arrival of a message at a communications interface). Consequently, in further preferred specific embodiments, interrupt program ISR2, which includes at least one of the following elements, is executed: e1') at least temporarily storing a context of the task and/or program interrupted by interrupt request IRQ', e.g., in the stack; optionally: e5) carrying out an evaluation of, e.g., the stack (cf., e.g., step 302 from FIG. 2K) and/or of the program counter (cf., e.g., step 304 from FIG. 2K); e6) identifying a task to be executed subsequently; e7) switching the context over to an identified zone (e.g., from the preceding step e6); the identified zone being associated with the identified task to be executed subsequently (alternatively, in further preferred specific embodiments, the switchover may also take place, e.g., based on address, e.g., with the aid of a CAN ID, VLAN ID, MAC address, or the like); e8) switching over from a current operating mode, e.g., supervisor mode, to another operating mode, e.g., user mode; e9) restoring a context for the subsequent task.

In further preferred specific embodiments, interrupt program ISR2 according to FIG. 7 may be used, for example, by supervisor SV (FIG. 5), in particular, in the case of intracore zone separation.

Figure 8:
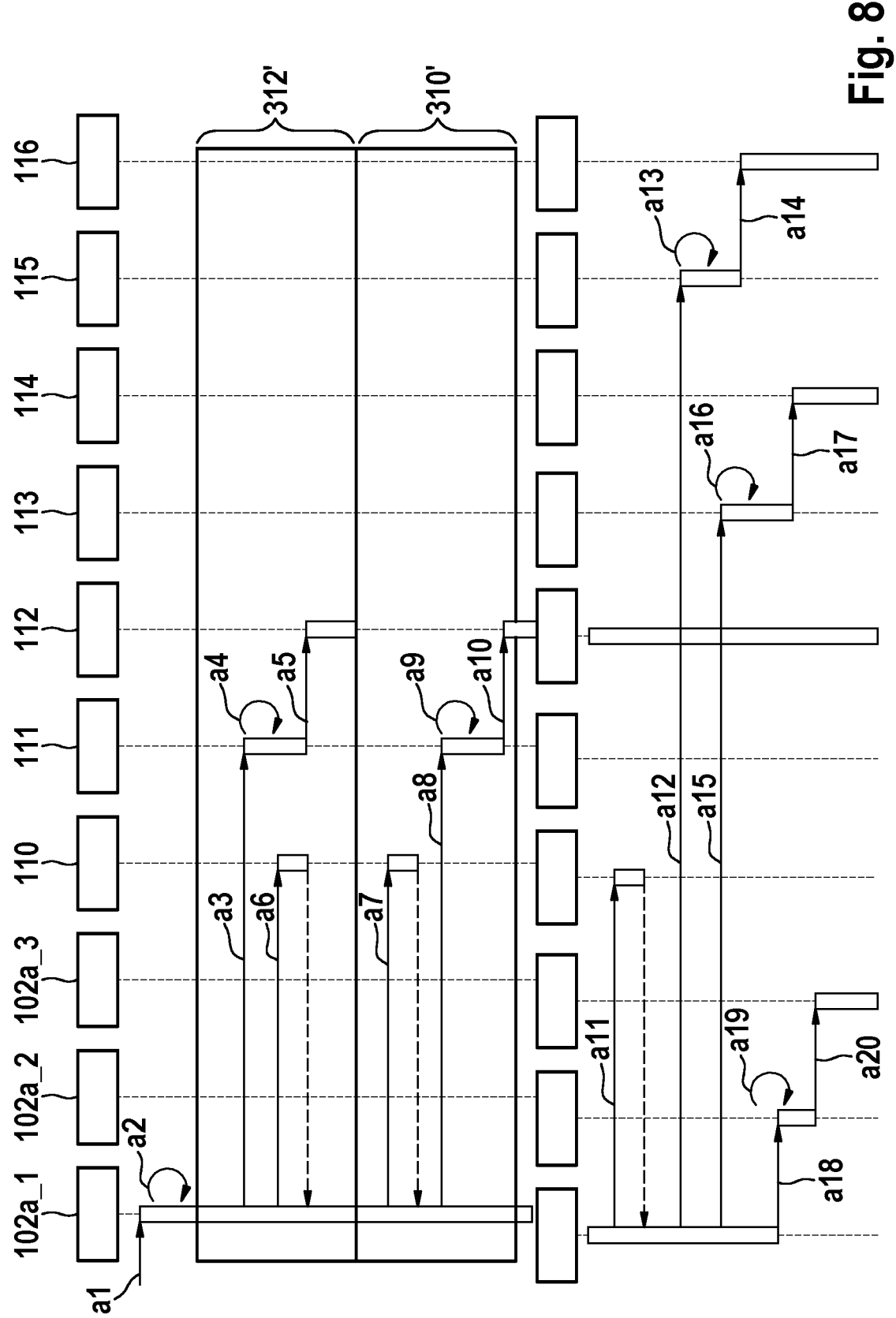
FIG. 8 shows a schematic flow chart according to further preferred specific embodiments of the present invention.

FIG. 8 schematically shows a flow chart according to further preferred specific embodiments, where reference numeral 310' denotes examples of aspects of a cold start of computing device 100, 100a, and reference numeral 312' denotes examples of aspects of a warm start of computing device 100, 100a. In the case of cold start 310', e.g., a test pattern for verifying the contents of RAM 1030 (FIG. 3) is not available. In the case of warm start 312', e.g., a test pattern for verifying the contents of RAM 1030 (FIG. 3) is available.

In further preferred specific embodiments, within the scope of a cold start to be run through at least once, a test pattern may be written to the volatile memory powered, in particular, in a power-down mode. Thus, due to the above-mentioned powering, the above-mentioned test pattern is retained in the intrinsically volatile memory. In further preferred specific embodiments, in at least one, in particular, each, start cycle, this (RAM) pattern is checked by a system state machine (finite state machine, which, in further preferred specific embodiments, is usable, e.g., for controlling system states), and, in particular, a cold start (e.g, if the (RAM) pattern is not available) or a warm start (e.g., if the (RAM) pattern is available) may be carried out as a function of the presence of the test pattern.

Thus, in further preferred specific embodiments, an integrity and authenticity of the volatile memory powered in power-down mode and/or of its data and functionalities contained and/or lying in it (e.g., processor core 102c and/or configuration data of the memory protection device, in particular, for the first and/or second zone and/or a program code) is ensured within the scope of the preceding cold start to be run through automatically at least once (secure boot and/or starting from the OTP memory, see above).

Consequently, in further preferred specific embodiments, invalid manipulation of the data and functionalities lying in the volatile memory powered in power-down mode, as well as of the RAM pattern, implies an at least temporary power-supply interruption and, therefore, erasure of the volatile memory powered in the power-down mode (RAM pattern, etc.). In further preferred specific embodiments, due to the missing RAM pattern, the system state machine would accordingly initiate, in particular, automatically, a cold start (secure boot and/or starting from OTP, see above) within the scope of the starting cycle, thereby ensuring the integrity and authenticity of the volatile memory powered in power-down mode and/or of its data and functionalities, prior to their use or execution.

In further preferred specific embodiments, in response to the presence of the test pattern, e.g., within the scope of a warm start, selected, time-critical SW instances are not checked prior to their execution (thus, e.g., not a secure boot, in particular), but possibly only at the running time/after their execution. This advantageously speeds up a start-up time for time-critical SW instances in the case of a warm start. Thus, in further preferred specific embodiments, integrity and authenticity during the warm start are advantageously ensured implicitly during the warm start, without an explicit check, by the availability of the test pattern (and, consequently, check during the previous cold start). In further preferred specific embodiments, components not critical with regard to time may also be checked explicitly during the warm start, prior to their execution (e.g., with the aid of a secure boot procedure).

For example, block 102a_1 symbolizes, for example, the first processor core 102a of the computing device (FIG. 3) as a "root of trust," that is, comparable to a hardware security reference analogous to a TPM (trusted platform module) or a hardware security module (HSM); block 102a_2 represents a boot manager (system program, which controls the loading and/or execution of further system and/or application programs) associated with processor core 102a. Block 102a_3 represents the execution of program code associated with zone Z2 and processor core 102a. Block 110 represents a hardware security module. Block 111 represents a boot manager associated with processor core 102c. Block 112 represents the execution of program code associated with zones Z1, Z2 and processor core 102c (which is, by way of example, assigned to the two zones Z1, Z2, as described above several times). Block 113 represents a boot manager associated with processor core 102b. Block 114 represents the execution of program code associated with zone Z1 and with processor core 102b. Block 115 represents a boot manager associated with processor core 102n. Block 116 represents the execution of program code associated with zones Z1, Z2 and processor core 102n.

Arrow a1 symbolizes a boot operation (start-up of computing device 100a, e.g., from a completely deactivated state). Arrow a2 symbolizes a configuration of at least one memory protection device, in particular, a memory protection device M5_1, M5_2, ..., M5_8 that is central and/or assigned to bus system 101 (FIG. 3). Arrow a3 symbolizes a start of the boot manager for processor core 102c, cf. block 111, as well.

Arrow a4 symbolizes a configuration of at least one dedicated memory protection device M3 (FIG. 3) for processor core 102c.

Arrow a5 symbolizes the start of the execution 112 of program code by processor core 102c. Arrow a6 symbolizes the optional verification of processor core 102c, e.g., in the form of an RTMD. In further preferred specific embodiments, the optional verification of the configuration data of memory protection device M3 may be carried out, in particular, with the aid of cryptographic methods, e.g., based on CMAC's and/or signed hash values.

Arrow a7 likewise symbolizes the optional verification of processor core 102c, in the context of a cold start 310'. In further preferred specific embodiments, the optional verification a7 may be carried out with the aid of cryptographic methods, e.g., based on CMAC's and/or signed hash values. Arrow a8 symbolizes a start of the boot manager for processor core 102c, in a manner similar to arrow a3, cf. block 111, as well. Arrow a9 symbolizes, in particular, in a manner similar to arrow a4, the configuration of the at least one dedicated memory protection device M3 (FIG. 3) for processor core 102c. Arrow a10 symbolizes the start of the execution 112 of program code by processor core 102c, in a manner similar to arrow a5.

Arrow a11 symbolizes the optional verification of a plurality of, preferably, all of, processor cores 102a, 102b, ..., 102n. Arrow a12 symbolizes a start of the boot manager for processor core 102n, cf. block 115, as well. Arrow a13 symbolizes the configuration of at least one dedicated memory protection device for processor core 102n. Arrow a14 symbolizes the start of the execution 116 of program code by processor core 102n.

Arrow a15 symbolizes a start of the boot manager for processor core 102b. Arrow a16 symbolizes the configuration of at least one dedicated memory protection device for processor core 102b.

Arrow a17 symbolizes the start of the execution 114 of program code by processor core 102b.

Arrow a18 symbolizes a start of the boot manager for processor core 102a. Arrow a19 symbolizes the configuration of at least one dedicated memory protection device for processor core 102a. Arrow a20 symbolizes the start of the execution 102a_3 of program code by processor core 102a.

Figure 9:
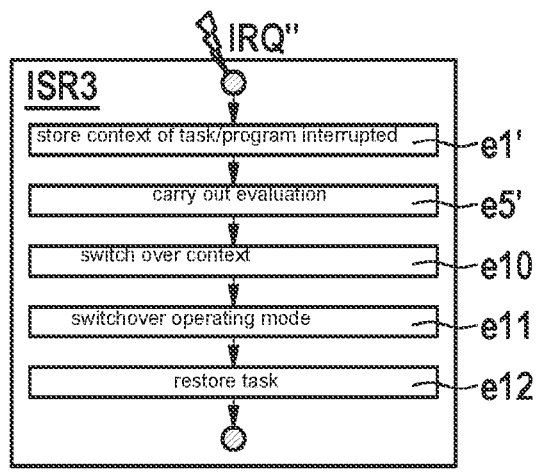
FIG. 9 shows aspects of an interrupt program according to further preferred specific embodiments of the present invention.

FIG. 9 schematically shows aspects of an interrupt program ISR3 according to further preferred specific embodiments, as are executable, e.g., at least intermittently, by at least one processor core 102a, 102b, ... of computing device 100, 100a. Lightning symbol IRQ" in FIG. 9 symbolizes an occurring interrupt request, as may be generated, e.g., cyclically (e.g., specifiable by a timer chip (timer)), and/or in a software-based manner (e.g., called by an application program). Consequently, in further preferred specific embodiments, interrupt program ISR3, which includes at least one of the following elements, is executed: e1') at least temporarily storing a context of the task and/or program interrupted by interrupt request IRQ"; optionally: e5') carrying out an evaluation of, e.g., the stack (cf., e.g., step 302 from FIG. 2K) and/or of the program counter (cf., e.g., step 304 from FIG. 2K); e10) switching over the context to a subsequent task (e.g., as a function of a task list that is preferably static); e11) switching over from a current operating mode, e.g., supervisor mode, to another operating mode, e.g., user mode; e12) restoring the task for the identified zone.

Figure 10:
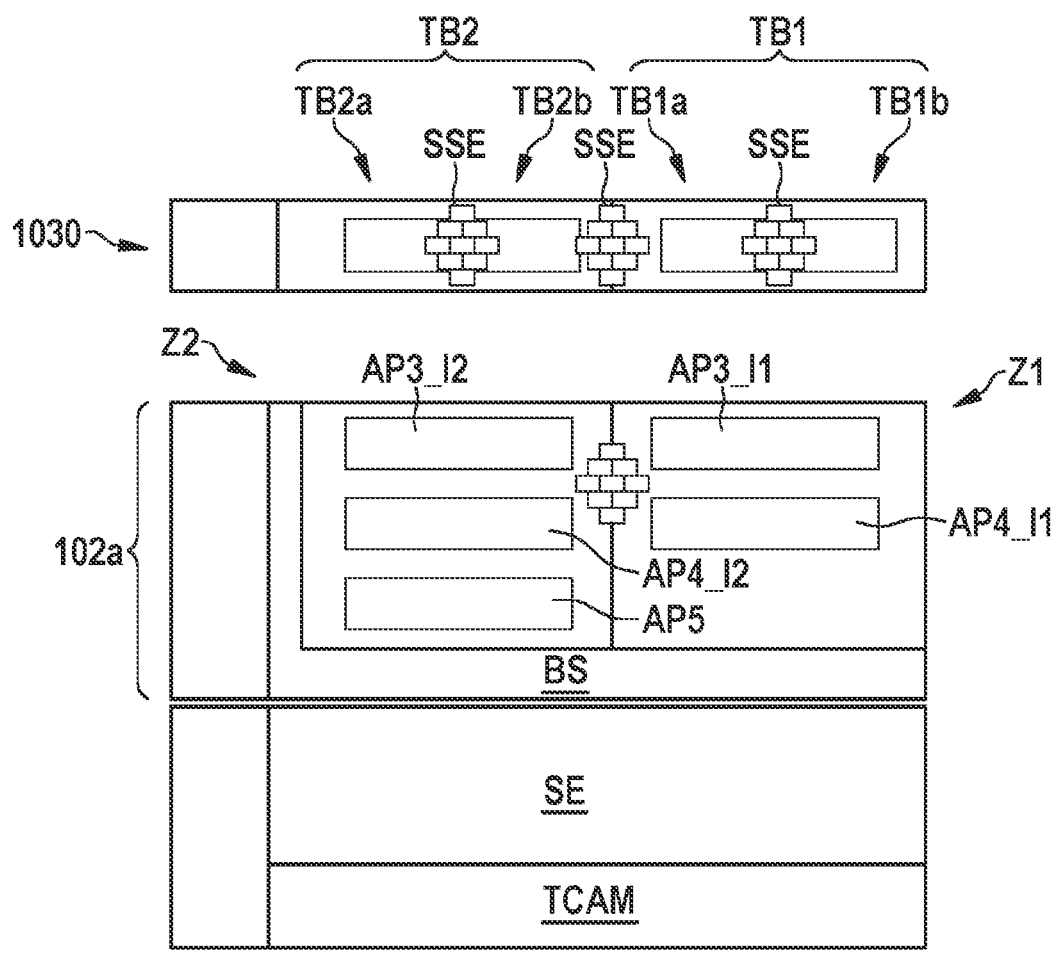
FIGS. 10 and 11 show, in each instance, a schematic, simplified block diagram of aspects according to further preferred specific embodiments of the present invention.

FIG. 10 schematically shows a processor core 102*a* according to further preferred specific embodiments, which is assigned an operating system BS and/or supervisor SV (similar to FIG. 5, not shown in FIG. 10), and which is, itself, assigned to two zones Z1, Z2. Processor core 102*a* may be used, e.g., for a network switch, in order, e.g., to transmit and/or to receive Ethernet data packets. Corresponding instances of application programs are denoted by the reference characters AP3_I1 (receiving of Ethernet packets, execution in zone Z1), AP3_I2 (receiving of Ethernet packets, execution in zone Z2), AP4_I1 (transmitting of Ethernet packets, execution in zone Z1), AP4_I2 (transmitting of Ethernet packets, execution in zone Z2). A further application program, which executes, e.g., management tasks for the network switch, runs only in the second zone Z2 defined as trustworthy, but not in the first zone Z1 defined as non-trustworthy. Processor core 102*a* is assigned a RAM 1030, which, in further preferred specific embodiments, may be distributed, e.g., in a manner comparable to FIG. 5. As an option, a switching engine (e.g., switching network) is provided, and/or a TCAM (ternary content-addressable memory) module.

Figure 11:
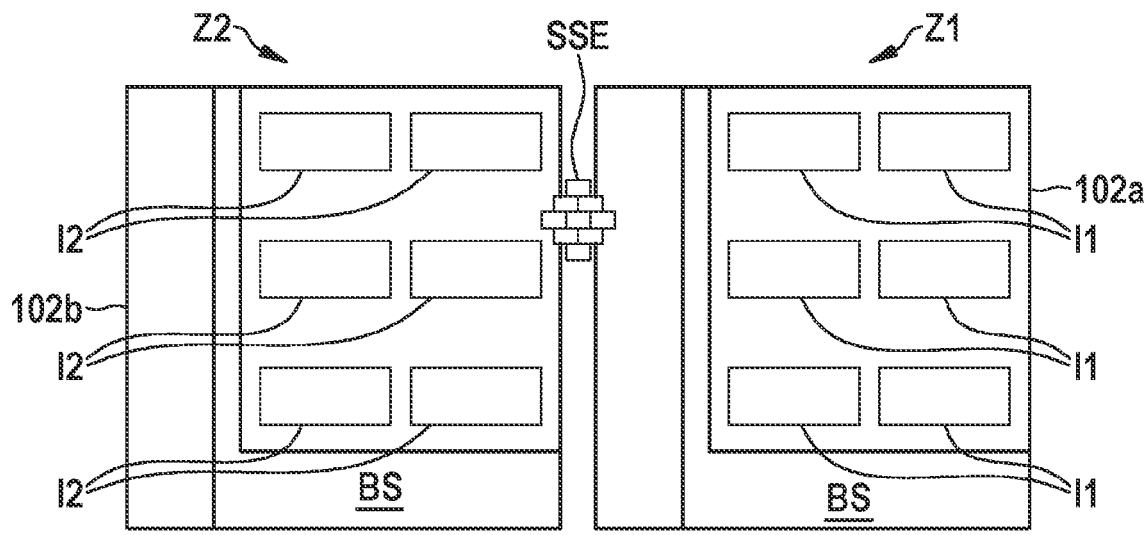

FIG. 11 schematically shows two processor cores 102*a*, 102*b* according to further preferred specific embodiments, where first processor core 102*a* is assigned to a first zone Z1, and second processor core 102*b* is assigned to a second zone Z2. The two processor cores 102*a*, 102*b* are each assigned an operating system BS.

First instances of different application programs, which, for the sake of clarity, are denoted altogether in FIG. 11 by the reference character I1, are assigned to first zone Z1 and, consequently, to first processor core 102*a*. In further preferred specific embodiments, the different application programs include, for example, at least one of the following elements: a) programs for carrying out an analysis of data packets, in particular, for deep packet inspection, DPI; b) programs for diagnosing; c) programs for performing updates, in particular, with the aid of FOTA (firmware over the air) techniques (for example, with the aid of data interface 1008, FIG. 22); d) programs for detecting attacks and warding off attacks (intrusion detection and prevention). In further preferred specific embodiments, second processor core 102*b* and second zone Z2 are assigned corresponding, second instances I2 of the application programs described above with regard to first zone Z1. According to further preferred specific embodiments, at least one memory protection device SSE may be used for controlling the read authorizations and/or write authorizations and/or executive authorizations, corresponding application programs, and/or instances of the different zones. Using the configuration described above as an example with reference to FIG. 11, a particularly secure system for analyzing data packets and/or for detecting attacks and warding off attacks may be provided efficiently, for example, for electronic control units and/or embedded systems and/or IoT systems and the like; the assignment of instances I1, I2 of the application programs to zones Z1, Z2 allowing, for example, contexts to be provided, in each instance, for the execution at different trust levels in a particularly advantageous manner.

Figure 12A:
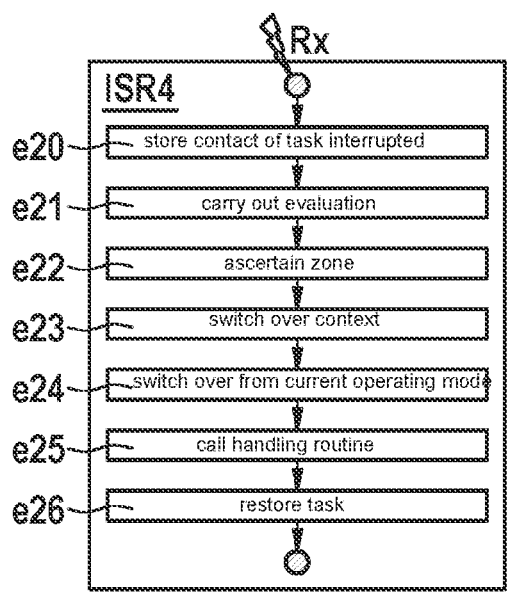
FIGS. 12A, 12B show, in each instance, schematic aspects of interrupt programs according to further preferred specific embodiments of the present invention.

FIG. 12A schematically shows aspects of an interrupt program ISR4 according to further preferred specific embodiments, as are executable, e.g., at least intermittently, by at least one processor core 102*a*, 102*b*, . . . of computing device 100, 100*a*. Lightning symbol Rx in FIG. 12A symbolizes an occurring interrupt request, as may be generated, e.g., in an event-driven manner, in this case, for example, during the reception of a message, e.g., of a CAN (controller area network) message.

Consequently, in further preferred specific embodiments, interrupt program ISR4, which includes at least one of the following elements, is executed: e20) at least temporarily storing a context of the task interrupted by interrupt request Rx, in particular, a transmission task ("Tx task"), for example, to transmit messages and/or programs; optionally: e21) carrying out an evaluation of, e.g., the stack (cf., e.g., step 302 from FIG. 2K) and/or of the program counter (cf., e.g., step 304 from FIG. 2K); e22) ascertaining a zone, with which a received data frame (e.g., of the above-mentioned, received CAN message) is associated; e23) switching over the context to the zone ascertained in step e22; e24) switching over from a current operating mode, e.g., supervisor mode, to another operating mode, e.g., user mode; e25) calling a handling routine for the message reception (receive (Rx) handler), that is, for example, an application program and/or a portion of an application program, which processes the received message; e26) restoring the task (e.g., transmission task) for the identified zone.

In further preferred specific embodiments, transmission tasks, that is, tasks and/or application programs and/or parts of application programs, are planned for transmitting messages (scheduling).

In further preferred specific embodiments, interrupt requests, which characterize the reception of a message (Rx IRQ, receive interrupt request), are processed at a higher priority than other interrupt requests, which are initiated, for example, by timing generators (timers) and/or application programs and/or software in general.

In further preferred specific embodiments, interrupt requests coming in simultaneously or within a specifiable, first time interval are prioritized, for example, as a function of the source of the interrupt request (incoming message, timing generator, software) and/or as a function of one or more other and/or further criteria. In further preferred specific embodiments, such prioritization may be carried out, for example, by a control device for interrupt requests (interrupt controller).

In further preferred specific embodiments, the switching-over of the context, cf., e.g., step e23 from FIG. 12A, may take place exclusively in a specifiable operating mode, in particular, in the supervisor mode.

In further preferred specific embodiments, the aspects described above by way of example, with reference to FIG. 12A, may be used, for example, to control the processing of incoming messages for a lightweight supervisor, in particular, a CAN lightweight supervisor, at least temporarily.

Figure 12B:
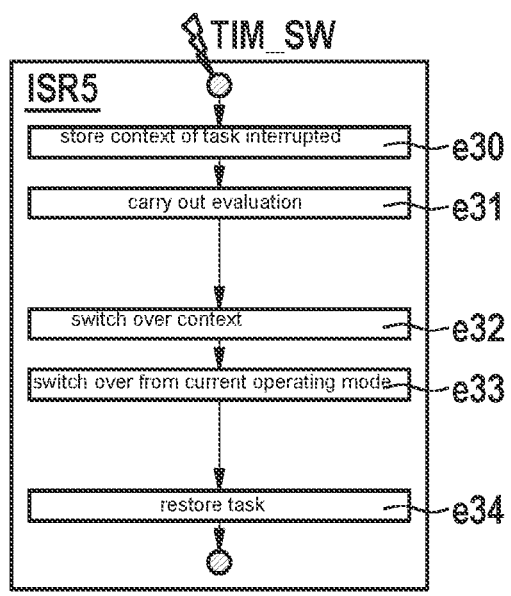

FIG. 12B schematically shows aspects of an interrupt program ISR5 according to further preferred specific embodiments, as are executable, e.g., at least intermittently, by at least one processor core 102*a*, 102*b*, . . . of computing device 100, 100*a*. Lightning symbol TIM_SW in FIG. 12B symbolizes an occurring interrupt request, as may be generated, e.g., by a timing generator or an application program and/or software in general. Consequently, in further preferred specific embodiments, interrupt program ISR5, which includes at least one of the following elements, is executed: e30) at least temporarily storing a context of the task interrupted by interrupt request Rx, in particular, a transmission task (Tx task), e.g., in order to transmit messages and/or programs; optionally: e31) carrying out an evaluation of, e.g., the stack (cf., e.g., step 302 from FIG. 2K) and/or of the program counter (cf., e.g., step 304 from FIG. 2K); e32) switching over the context to a following transmission task (e.g., according to an, in particular, static task list); e33) switching over from a current operating mode, e.g., supervisor mode, to another operating mode, e.g., user mode; e34) restoring the task (e.g., transmission task) for the identified zone.

In further preferred specific embodiments, the further aspects described above by way of example, with reference to FIG. 12A, apply to interrupt program ISR5 of FIG. 12B in a corresponding manner.

Figure 13:
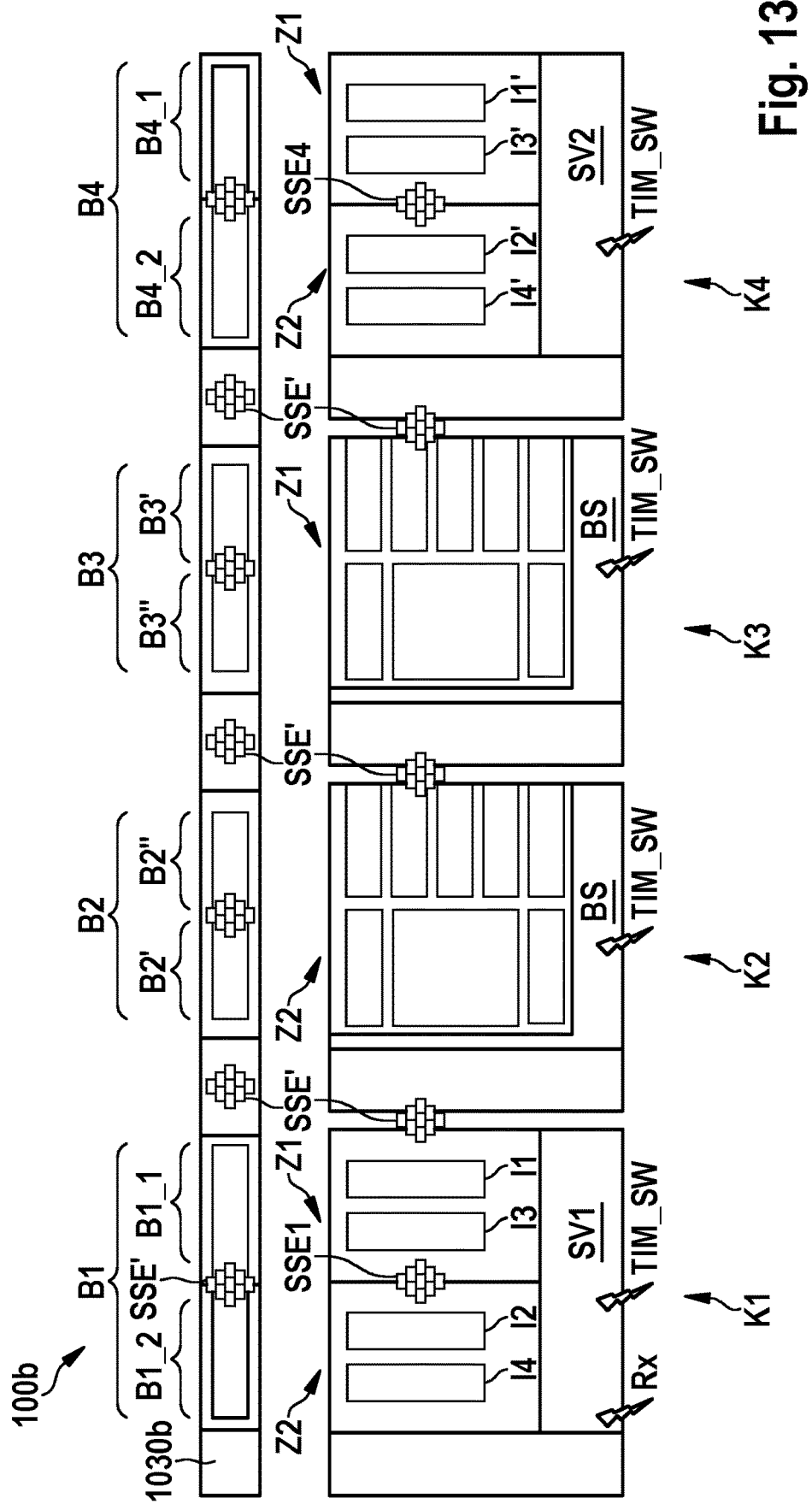
FIG. 13 shows a schematic, simplified block diagram of aspects according to further preferred specific embodiments of the present invention.

FIG. 13 schematically shows a simplified block diagram of aspects of a computing device 100b according to further preferred specific embodiments. By way of example, computing device 100b presently includes four processor cores K1, K2, K3, K4, of which the first processor core K1 is configured to process communications messages, in particular, CAN messages. Thus, in further preferred specific embodiments, first processor core K1 shown in FIG. 13 may also to be referred to as a CAN core. Further processor cores K2, K3 are intended for executing (if indicated, different instances of) application programs, and, in further preferred specific embodiments, may therefore be referred to as application cores K2, K3, as well. The fourth processor core K4 shown in FIG. 13 is configured to process Ethernet communications messages, and, in further preferred specific embodiments, may therefore be referred to as an Ethernet core and/or ETH core K4, as well. First processor core K1 is assigned a first supervisor SV1, in particular, a CAN lightweight supervisor, and fourth processor core K4 is assigned a second supervisor SV2, in particular, an ETH (Ethernet) lightweight supervisor.

In further preferred specific embodiments, first processor core K1 is assigned to two zones Z1, Z2. In further preferred specific embodiments, fourth processor core K4 is also assigned to two zones Z1, Z2.

In further preferred specific embodiments, first processor core K1 is assigned an application program for transmitting and/or receiving CAN messages; the reference character I1 in FIG. 13 referring to a first instance (that is, a program and/or subroutine and/or proxy) of this application program, which first instance I1 is assigned to first zone Z1 and is configured to receive CAN messages. In contrast, reference character I2 denotes a second instance (and/or a program and/or subroutine and/or proxy) of this application program, which is assigned to second zone Z2 and is configured to receive CAN messages. Reference characters I3, I4 denote corresponding instances (and/or a program and/or subroutine and/or proxy) for transmitting and/or receiving CAN messages, which are each assigned to one of the two zones Z1, Z2, as well.

In further preferred specific embodiments, the interrupt requests Rx, TIM_SW described above by way of example, with reference to FIGS. 12A, 12B, may be processed by first processor core K1, for example, by executing a corresponding interrupt program ISR4 (FIG. 12A) and/or ISR5 (FIG. 12B).

In further preferred specific embodiments, fourth processor core K4 is assigned an application program for transmitting and/or receiving Ethernet messages; the reference character I1' in FIG. 13 referring to a first instance (that is, a program and/or subroutine and/or proxy) of this application program, which first instance I1' is assigned to first zone Z1 and is configured to receive Ethernet messages. In contrast, reference character I2' denotes a second instance (and/or a program and/or subroutine and/or proxy) of this application program, which is assigned to second zone Z2 and is configured to receive Ethernet messages. Reference characters I3', I4' denote corresponding instances (and/or a program and/or subroutine and/or proxy) for transmitting and/or receiving Ethernet messages, which are each assigned to one of the two zones Z1, Z2, as well.

In further preferred specific embodiments, the two zones Z1, Z2 are separated within processor cores K1, K4, using, in each instance, at least one memory protection device SSE1, SSE4.

As already mentioned above, the two application cores K2, K3 are configured to execute application programs, which and/or whose individual instances (and/or a program and/or subroutine and/or proxy) are indicated in FIG. 13 as rectangles within the respective application cores K2, K3, but not denoted in more detail for the sake of clarity. In further preferred specific embodiments, second processor core K2 is assigned to second zone Z2, and third processor core K3 is assigned to first zone Z1.

In further preferred specific embodiments, computing device 100b includes a volatile memory, in particular, a working memory (RAM) 1030b, which is divided up, for example, in a manner comparable to the representation of FIG. 4, into different areas, in particular, different buffer storage areas, which are assigned to different respective processor cores K1, K2, K3, K4 and/or their zones Z1, Z2.

For example, a first area B1 of working memory 1030b of computing device 100b according to FIG. 13 is assigned to first processor core K1; a first subregion B1_1 being assigned to first zone Z1, and a second subregion B1_2 being assigned to second zone Z2. In further preferred specific embodiments, a comparable division into corresponding areas and/or subregions B4, B4_1, B4_2 is also possible for fourth processor core K4.

In further preferred specific embodiments, further regions B2, B3 of working memory 1030b may be assigned, for example, to application cores K2, K3. For example, in further preferred specific embodiments, area B2 is further divisible into a trustworthy area B2' and into a non-trustworthy area B2". In further preferred specific embodiments, something comparable may also apply to third application core K3, cf. reference characters B3', B3".

In further preferred specific embodiments, one or more additional memory protection devices, which are referred to collectively in FIG. 13 by reference character SSE', are provided, in order to implement a specific division with regard to, e.g., read authorizations and/or write authorizations and/or executive authorizations in accordance with preferred specific embodiments.

In further preferred specific embodiments, computing device 100b according to FIG. 13 may provide, for example, the functionality of a gateway 432, that is, a network coupling element, which may couple, for example, a CAN bus (cf. CAN core K1) to an Ethernet network (cf. ETH core K4). In further preferred specific embodiments, for example, first processor core K1 may assume the function of a so-called high-speed routing engine for CAN messages, and/or fourth processor core K4 may assume the function of a so-called high-speed engine for Ethernet messages.

Figure 14:
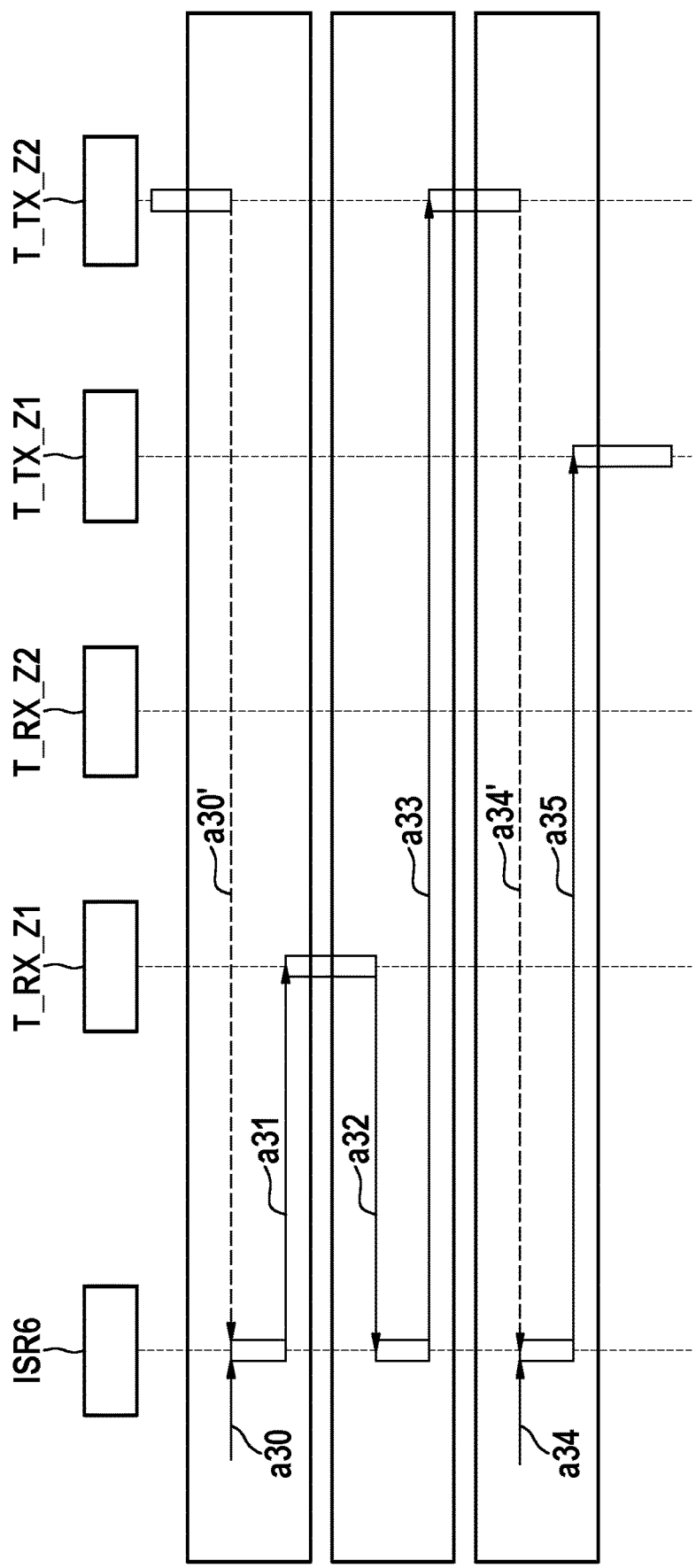
FIG. 14 shows a schematic flow chart according to further preferred specific embodiments of the present invention.

FIG. 14 schematically shows a flow chart according to further preferred specific embodiments, which illustrates, for example, the processing of interrupt requests, e.g., during the reception of messages, in particular, CAN messages.

Block ISR6 illustratively represents an interrupt program, which is executable, for example, in response to at least one of the following interrupt requests: a) reception of a message (Rx); b) signaling of a timing generator (timer); c) interrupt request generated with the aid of software (SW). Block T_RX_Z1 represents, for example, a task (e.g., part or instance of an application program), which is assigned to zone Z1 and is executed in response to the reception (Rx) of a message, in a manner comparable to instance I1 of first processor core K1 of computing device 100b according to FIG. 13. Block T_RX_Z2 represents, for example, a task, which is assigned to zone Z2 and is executed in response to the reception of a message, in a manner comparable to instance I2 of first processor core K1 of computing device 100b according to FIG. 13. Block T_TX_Z1 represents, for example, a task, which is assigned to zone Z1 and is executed in response to the transmission of a message, in a manner comparable to instance I3 of first processor core K1 of computing device 100b according to FIG. 13. Block T_TX_Z2 represents, for example, a task, which is assigned to zone Z2 and is executed in response to the transmission of a message, in a manner comparable to instance I4 of first processor core K1 of computing device 100b according to FIG. 13.

Arrow a30 represents an interrupt request triggered by the reception of a (CAN) message, which interrupts, in particular, the processing of a task currently running, cf. transmission task T_TX_Z2, cf. arrow a30'. Consequently, in further preferred specific embodiments, receiver task T_RX_Z1 is called up by interrupt program ISR6, cf. arrow a31. After the execution of receiver task T_RX_Z1, it branches again to interrupt program ISR6, preferably, with the aid of a software interrupt request (software interrupt) a32; the interrupt program then continuing the previously interrupted transmission task T_TX_Z2, cf. arrow a33. In response to the occurrence a34 of an interrupt request (timer IRQ) generated by a timing generator, interrupt program ISR6 calls up transmission task T_TX_Z1, cf. arrow a35, which results in the interruption a34' of the transmission task T_TX_Z2 previously running.

From the diagram shown in FIG. 14 and the above descriptions, it is clearly apparent, how different subprograms (tasks), which are executable by a computing device in accordance with the specific embodiments and, according to the principle of the specific embodiments, may be assigned to different zones Z1, Z2, . . . (according to further preferred specific embodiments, more than two zones are possible, as well) and may be executed; and/or how their execution may be controlled, for example, by an interrupt program ISR6, which may be, for example, part of an operating system BS and/or supervisor SV.

Figure 15:
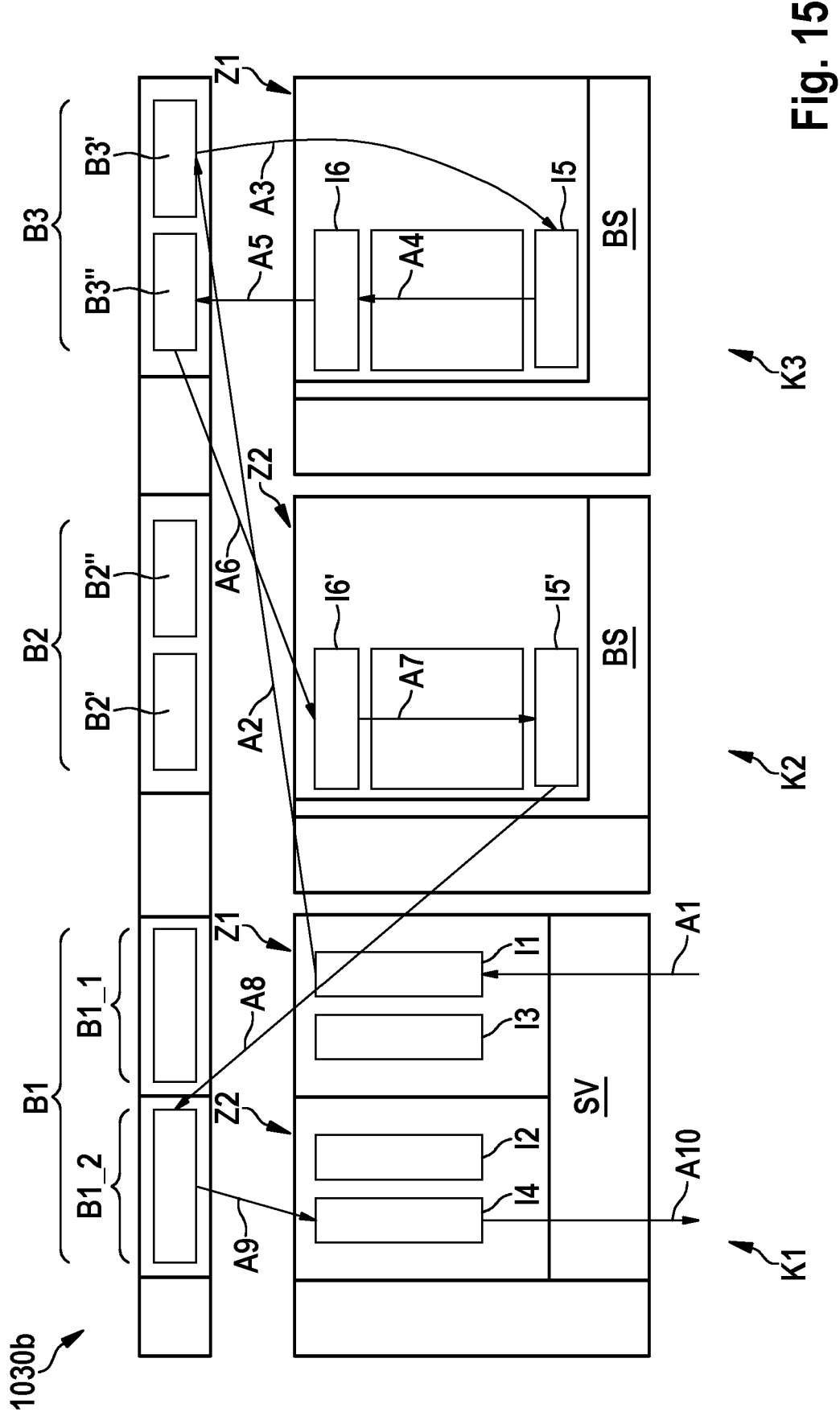
FIGS. 15 through 19 show, in each instance, a schematic, simplified block diagram of aspects according to further preferred specific embodiments, of the present invention.

FIG. 15 schematically shows a simplified block diagram of aspects according to further preferred specific embodiments; at present, an example of an application being illustrated, which includes, as subject matter, an example of a zone transition ZT, that is, the transmission of data from a first zone according to preferred specific embodiments, to a second zone according to preferred specific embodiments.

In this context, first processor core K1 shown in FIG. 15 corresponds to the CAN core K1 already described above with reference to FIG. 13, and further processor cores K2, K3 from FIG. 15 correspond to application cores K2, K3 according to FIG. 13. The same also applies to areas B1, B2, B3 of working memory 1030b, and/or to their subregions.

Arrow A1 represents the reception of a CAN message, which initiates the processing of a corresponding application program of first processor core K1 by instance I1 (and/or a program and/or subroutine and/or proxy). Instance I1, which is assigned to first zone Z1, transmits data of the received CAN message and/or data derived from them via the working memory (in particular, via the further exchange buffer storage area B3"), cf. arrow A2, to an instance I5 (that is, a program and/or subroutine and/or proxy) of an application program for processing such data; the instance being assigned to first zone Z1 and being executable by third processor core K3, cf. arrow A3. Reference character I6 from FIG. 15 denotes an instance of an application program for analyzing data packets, in particular, deep packet inspection, DPI, which checks the received data (which are situated in exchange buffer storage area B3") in more detail and then writes them to subregion B3'" of working memory 1030b, cf. arrow A5. Further instance I6' of the DPI application program, which is executed in second processor core K2, and which is assigned to second zone Z2, then reads the data from subregion B3'", which corresponds to the zone transition ZT already mentioned above, cf. arrow A6.

In further preferred specific embodiments, in particular, an in-depth (along the lines of a DPI) payload analysis is carried out, e.g., by instance I6' (Z2-DPI-proxy, that is, the proxy assigned to second zone Z2 for executing DPI methods); instance I6 (Z1-DPI-Proxy, that is, the proxy assigned to first zone Z1 for executing DPI methods) preferably being responsible for copying the data to B3'".

After the data are optionally processed further by second processor core K2, cf. arrow A7, the data and/or data derived from them are written by an instance I5' to storage area B1_2 (second buffer storage area) of working memory 1030b, cf. arrow A8, from which the instance I4, which is configured, for example, to transmit CAN messages and is assigned to second zone Z2, and which is executable by CAN core K1, extracts the data and, for example, transmits them onto the CAN bus, cf. arrow A10.

The scenario described above by way of example, with reference to FIG. 15, may be used for at least one of the following applications: a) diagnosing, using CAN messages; b) DPI applied to CAN messages; c) forming a proxy, e.g., a proxy for a communications and/or diagnostic protocol or the like; d) routing of, e.g., a first CAN bus to, e.g., a second CAN bus, in particular, in view of application programs (this permits, for example, processing of the CAN messages to be routed, in particular, an analysis and/or modification).

Figure 16:
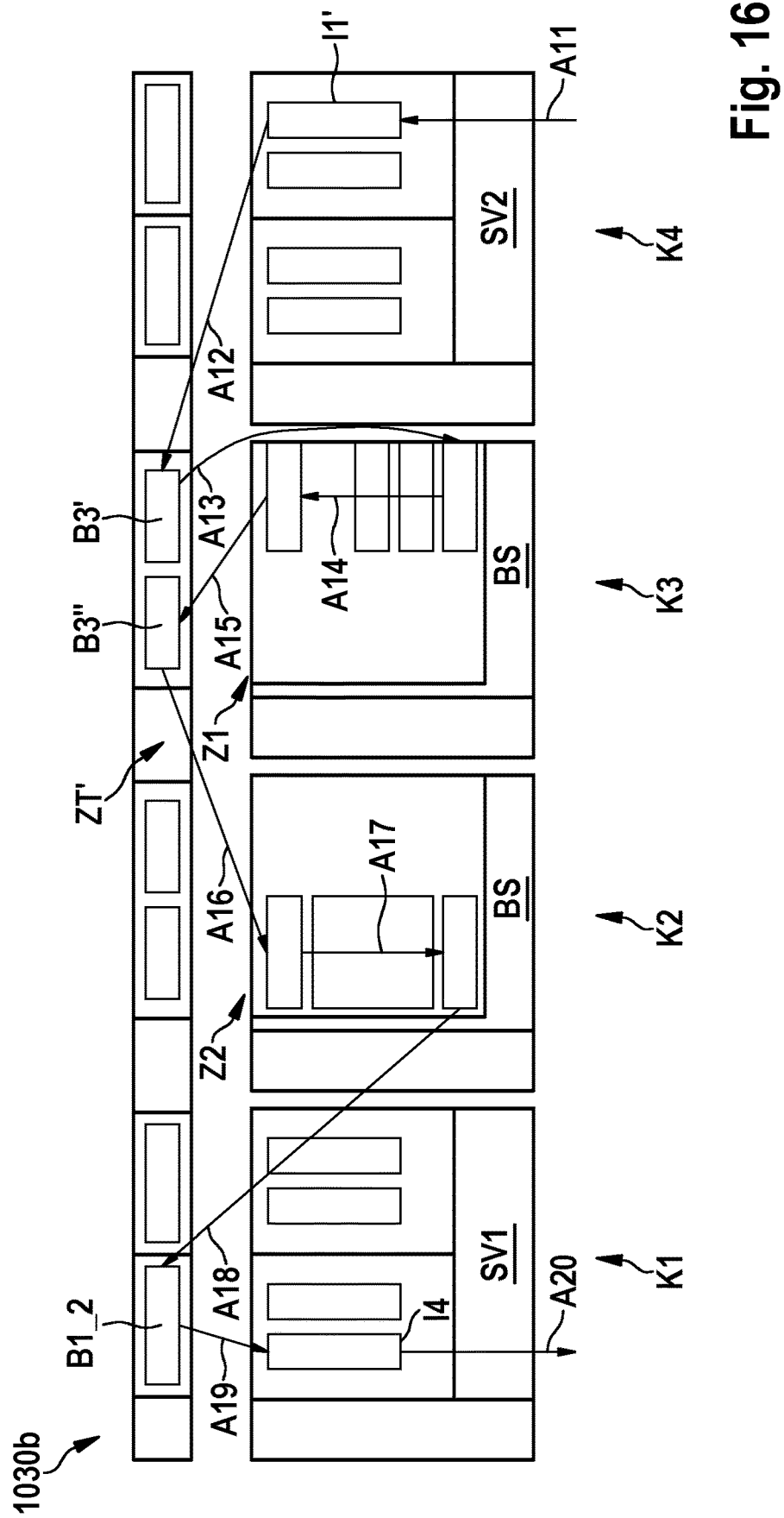

FIG. 16 schematically shows a simplified block diagram of aspects according to further preferred specific embodiments in accordance with the representations of FIG. 13 and FIG. 15; at present, an example of an application being illustrated, which includes, as subject matter, an example of a zone transition ZT', that is, the transmission of data from a first zone Z1 according to preferred specific embodiments, to a second zone Z2 according to preferred specific embodiments. In contrast to the scenario according to FIG. 15, in the scenario shown in FIG. 16, zone transition ZT' takes place, starting from Ethernet core K4, to CAN core K1, in accordance with arrows A11 to A20.

From FIG. 16, it is apparent that after the reception A11 of the Ethernet message, corresponding data are stored in the storage area, that is, in first buffer storage area B3' (arrow A12), from where they are read in by the application core K3 assigned to first zone Z1 (arrow A13), and processed (arrow A14); and the correspondingly processed data are then written to the further storage area and/or exchange buffer storage area B3" (arrow A15).

These data are then read in by the application core K2 assigned to second zone Z2, cf. arrow A16, processed, cf. arrow A17, and written to the further storage area and/or second buffer storage area B1_2, cf. arrow A18. The data are then read in by CAN core K1 from second buffer storage area B1_2 (arrow A19), processed by instance I4 (part of an application program for transmitting CAN messages), and transmitted on the CAN bus (not shown), cf. arrow A20.

Figure 17:
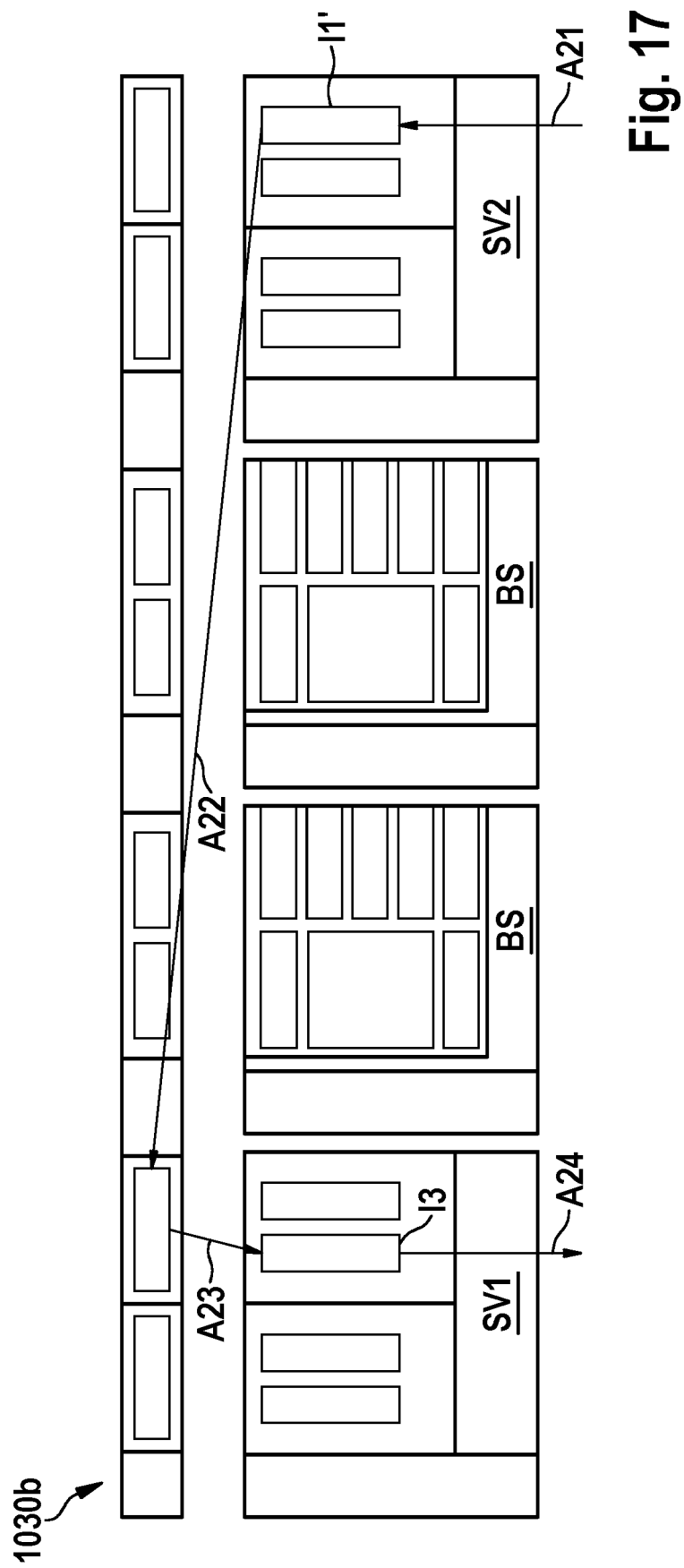

FIG. 17 shows, by way of example, a configuration comparable to FIG. 16, where an incoming Ethernet message is received by processor core K4 (A21), temporarily stored in working memory 1030b (A22), and read with the aid of an instance I3 of first processor core K1 (A23), and transmitted onto a CAN bus (A24).

Figure 18:
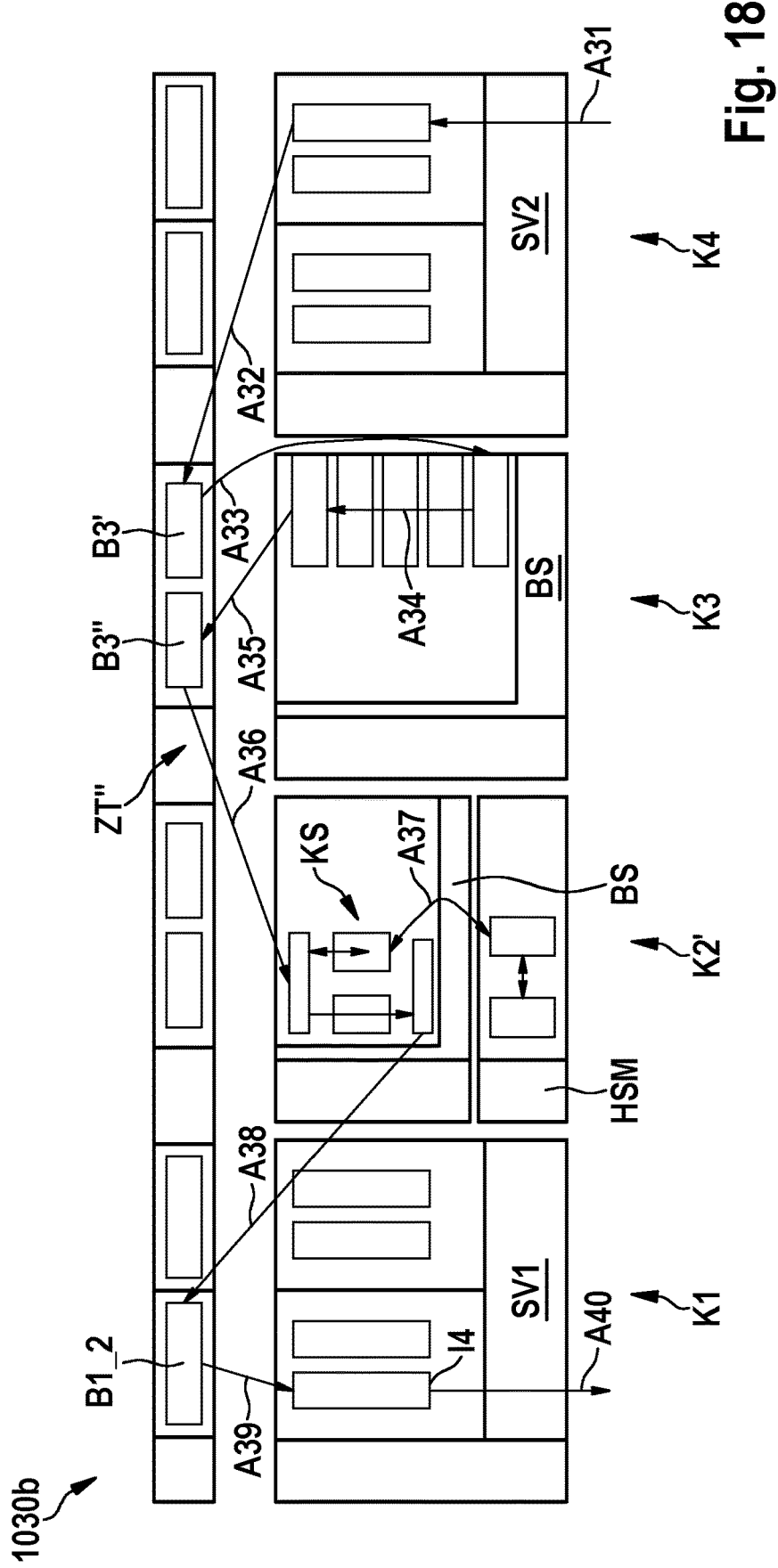

FIG. 18 schematically shows a simplified block diagram of aspects according to further preferred specific embodiments, in accordance with the representations of FIG. 13 and FIG. 15; by way of example, an application presently being illustrated, in which a hardware security module HSM is used. For example, hardware security module HSM is presently integrated into the computing device (not labeled in FIG. 18, cf., e.g., reference numeral 100 from FIG. 1), which includes, inter alia, second processor core K2', as well, and is configured to execute cryptographic functions. In further preferred specific embodiments, the cryptographic functions may include, for example, the storage of (secret) keys and/or the generation of hash values and/or signatures and the like.

In further preferred specific embodiments, hardware security module HSM constitutes an independent (on-chip) module, which is preferably positioned on the same semiconductor substrate, that is, die (chip), as the computing device. Hardware security module HSM preferably includes a separate processor core (not shown), as well as, in some instances, a separate storage device, etc.

In further preferred specific embodiments, a crypto-stack KS is provided, which may be used for communication between the processor cores of the computing device and hardware security module HSM. In further preferred specific embodiments, for security reasons, in particular, this crypto-stack KS is only implemented in processor core K2', since processor core K2' presently constitutes, for example, the only processor core of the computing device; the processor core being assigned exclusively to trustworthy zone Z2. Consequently, in further preferred specific embodiments, processor core K2' may be regarded as the most secure core. Arrows A31, A32, A33, A34, A35, A36 represent, by way of example, the following steps: receiving (A31) an Ethernet message; storing (A32) the received message in first buffer storage area B3'; loading (A33) this message, using an application program of third processor core K3; processing (A34) the loaded message, using third processor core K3; writing (A35) the data obtained during the processing to exchange buffer storage area B3"; loading (A36) the written data from exchange buffer storage area B3", using a program and/or application program, which is executable in second processor core K2.

In further preferred specific embodiments, second processor core K2 processes the loaded data, using, in particular, hardware security module HSM, as well, cf. arrow A37. Processing A37 may include, for example, the encryption of data. Processed data A38 are then written to second buffer storage area B1_2 (A38). Subsequently, the data are loaded from second buffer storage area B1_2 by the instance of CAN core K1 (A39) and transmitted onto the CAN bus.

Figure 19:
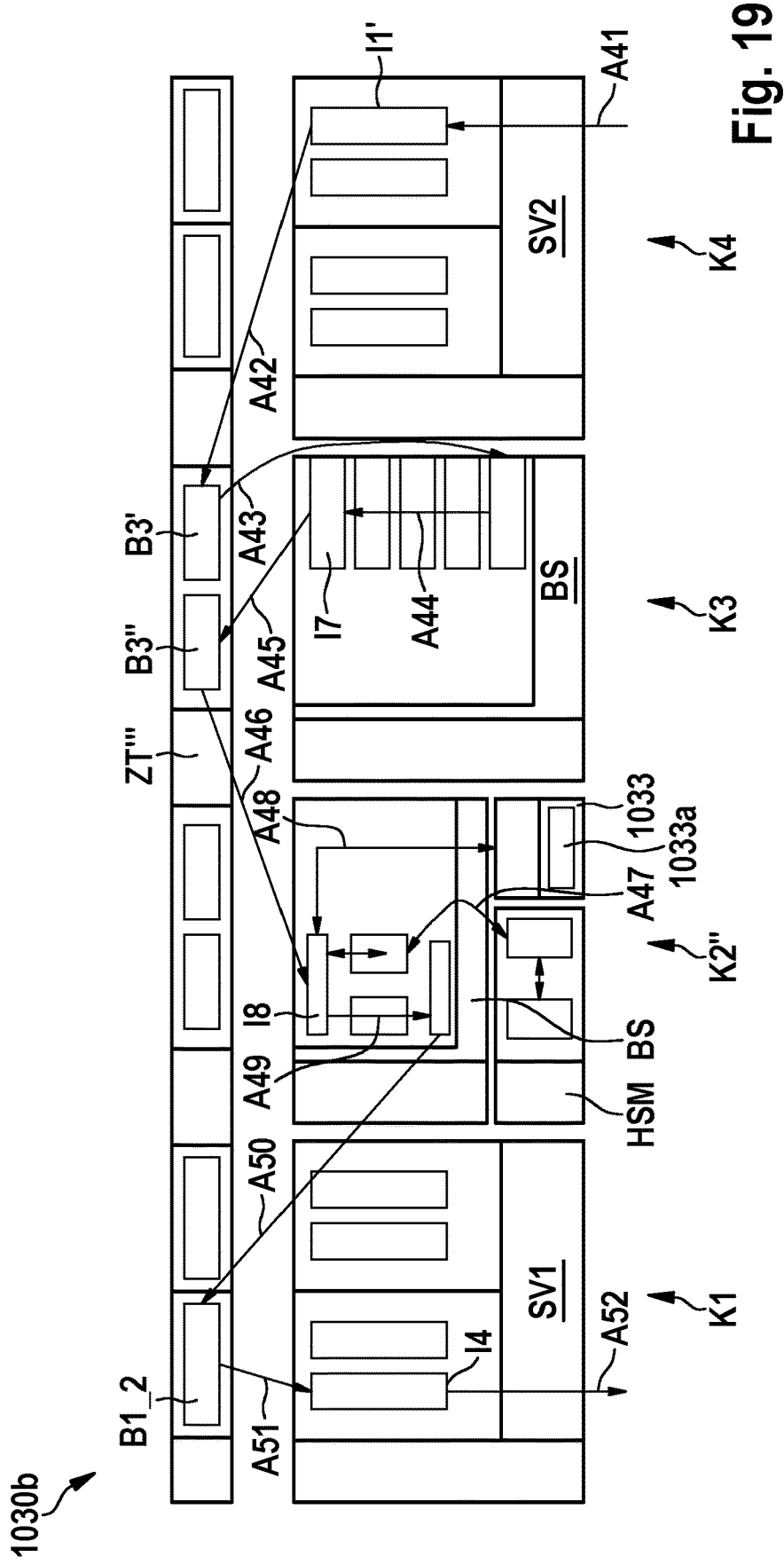

FIG. 19 schematically shows a simplified block diagram of aspects according to further preferred specific embodiments, in accordance with the representation of FIG. 18; by way of example, an application presently being illustrated, where, e.g., a firmware update, in particular, of the type FOTA (firmware over the air), is executable. In preferred specific embodiments, for example, data may be received via an Ethernet connection, for example with the aid of fourth processor core K4, cf. arrow A41. An instance I1' of a receiving program writes the received data to first buffer storage area B3', cf. arrow A42. Instances of application programs in application processor core K3 load the data from first buffer storage area B3' (A43) and process them (A44). A further instance I7, which is, for example, a first FOTA proxy 17, extracts the data necessary for the FOTA operation from the processed data and writes (A45) the extracted data to the exchange buffer storage area B3" regarded, for example, (in particular, from the perspective of second zone Z2) as non-trustworthy. An instance I8 of an application program, which is, for example, a second FOTA proxy, and is executable in processor core K2", loads (arrow A46) the data from exchange buffer storage area B3". As an option, a cryptographic method may be executed on the loaded data by processor core K2", for example, CMAC generation, which hardware security module HSM advantageously uses, cf. arrow A47. In further preferred specific embodiments, processed data and/or CMAC values may optionally be stored in an external storage device, cf. arrow A48. In further preferred specific embodiments, such storage is controlled by FOTA proxy I8.

In further preferred specific embodiments, second zone Z2 has only read access, but, in particular, no write access and/or execution access to exchange buffer storage area B3". In further preferred specific embodiments, this may also apply in a corresponding manner, e.g., to the configurations described above by way of example, with reference to FIG. 4, 5.

In further preferred specific embodiments, for example, complete memory representations (ECU image) 1033a for at least one processor core and/or the entire computing device and/or a corresponding control unit, may be also be stored temporarily in external storage device 1033.

In further preferred specific embodiments, an application program and/or a corresponding instance of it, executable by second processor core K2", may check and/or validate, for example, the contents of data stored in external storage device 1033.

In further preferred specific embodiments, for example, after successful validation of the data contained in external storage device 1033, a corresponding memory representation 1033a may be distributed to one or more external devices (not shown), cf. arrows A49, A50, A51, A52, which have, as subject matter, inter alia, e.g., blockwise copying of memory representation 1033a from external storage device 1033a to second buffer storage area B1_2 of working memory 1030b (A50), and from there, to instance I4 (e.g., CAN transmission task).

In further preferred specific embodiments, the validation may preferably be carried out on the basis of digital signatures and/or signed hash values. For example, in further preferred specific embodiments, a signed hash value may be present for each ECU image. In further preferred specific embodiments, signature verification may preferably be carried out by hardware security module HSM.

In further preferred specific embodiments, for example, preferably blockwise checking of a CMAC value and/or another value, which allows checking of the integrity and/or authenticity of the relevant blocks, is also carried out again during the distribution and/or copying of memory representation 1033a, for example, controlled by corresponding instances of application programs, which run, for example, in second processor core K2", optionally supported by hardware security module HSM.

In further preferred specific embodiments, generation and verification of, e.g., CMAC values may act, in particular, as additional integrity and authenticity protection, e.g., for signature verification. In further preferred specific embodiments, e.g., an individual and/or each individual data packet from exchange buffer storage area B3" may be provided with a CMAC value or a truncated CMAC value. In further preferred specific embodiments, this (these) are verified prior to transmission to second buffer storage area B1_2, which means that it is particularly ensured, that only data packets, which are of integrity and are authentic, arrive at second buffer storage area B1_2. In further preferred specific embodiments, buffer-wise CMAC generation and verification are optional. FIGS. 20, 21 schematically show flow charts according to further preferred specific embodiments, which illustrate, for example, the processing of interrupt requests, e.g., during the reception of messages, in particular, CAN messages.

Block ISR7 represents an example of an interrupt program, which is executable, for example, in response to interrupt requests, which signal (Rx ISR) the reception of a message (Rx).

Block ISR8 represents an example of an interrupt routine, which is executable, for example, in response to at least one of the following interrupt requests: a) signaling of a timing generator (timer); b) an interrupt request generated with the aid of software (SW ISR).

Block RX_H_Z1 represents, for example, a reception handler (e.g., part and/or instance of an application program, which controls the reception of a message), which is assigned to zone Z1 and is executed in response to the reception (Rx) of a message, in a manner comparable to instance I1 of first processor core K1 of computing device 100b according to FIG. 13.

Block RX_H_Z2 represents, for example, a reception handler (e.g., part and/or instance of an application program, which controls the reception of a message), which is assigned to zone Z2 and is executed in response to the reception (Rx) of a message, in a manner comparable to instance I2 of first processor core K1 of computing device 100b according to FIG. 13.

Block T_TX_Z1' represents, for example, a task, which is assigned to zone Z1 and is executed in response to the transmission of a message, in a manner comparable to instance I3 of first processor core K1 of computing device 100b according to FIG. 13. Block T_TX_Z2' represents, for example, a task, which is assigned to zone Z2 and is executed in response to the transmission of a message, in a manner comparable to instance I4 of first processor core K1 of computing device 100b according to FIG. 13.

Arrow a40 represents an interrupt request triggered by the reception of a (CAN) message, which interrupts, in particular, the processing of a task currently running, cf. transmission task T_TX_Z2', cf. arrow a40'. Consequently, in further preferred specific embodiments, reception handler RX_H_Z1 is called up by interrupt program ISR7, cf. arrow a41. After reception handler RX_H_Z1 is executed, it returns to interrupt program ISR7 (e.g., preferably using an interrupt request generated with the aid of software), arrow a42.

According to the example shown in FIG. 20, transmission task T_TX_Z1' is then executed, cf. arrow a43. In further preferred specific embodiments, a particular advantage of this may be that due to task RX_H_Z1, the static configuration (e.g., corresponding configuration data set) of the memory protection device is already active for first zone Z1 anyway, which preferably applies to transmission task T_TX_Z1', as well. In particular, from the point of view of performance, this allows the switching-over of the relevant static configuration of the memory protection device prior to the execution of transmission task T_TX_Z1' to be dispensed with.

In response to the occurrence a44 of an interrupt request (timer IRQ) generated by a timing generator, interrupt program ISR7 calls up transmission task T_TX_Z2', cf. arrow a45, which results in the interruption a44' of the transmission task T_TX_Z1' previously running. A switchover to the static configuration (e.g., corresponding configuration data set) of zone Z2 preferably occurs prior to the execution of transmission task T_TX_Z2'. After that, the flow chart returns to interrupt program ISR7, e.g., with the aid of a software interrupt a46, whereupon transmission task T_TX_Z1' is continued, cf. arrow a47.

In further preferred specific embodiments, interrupt routine ISR7 shown in FIG. 20, 21 may have, e.g., a configuration comparable and/or identical to configuration ISR4 according to FIG. 12A.

Further preferred specific embodiments, aspects, and advantages of the principle according to the specific embodiments are described below, which, according to further preferred specific embodiments, may each be combined individually, or in combination with each other, with at least one of the specific embodiments described above.

In further preferred specific embodiments, a limiting of the access rights to storage device 1030a shown in FIG. 4, 5 may be used as a measure to limit the attack surface on the computing device, which enables zonewise memory separation, e.g., using mechanisms of memory protection devices known per se. In further specific embodiments, it is particularly preferable for zonewise memory separation to be able to be accomplished in the forms of memory mentioned below by way of example: Buffers, for example, in the form of a trustworthy buffer memory (trusted buffer (e.g., in a shared RAM 1030)) and/or in the form of a non-trustworthy buffer memory (non-trusted buffer (e.g., in shared RAM 1030)), stack, data storage unit (e.g., DataFlash, EEPROM, etc.), program memory (e.g., Program Flash, ROM, etc.), SFR's (special function registers).

In further preferred specific embodiments, data may be exchanged between different zones ("intrazone and/or interzone data exchange), using, for example, buffers situated in a shared RAM (divided working memory, cf. reference character 1030a from FIG. 4).

In further preferred specific embodiments, for example, in each instance, at least one trusted and non-trusted buffer and/or buffer storage areas may be provided per instance I1, I2, I3 (proxy) of an application program and per zone (buffers may possibly be omitted as a function of the application), cf., e.g., subregions TB1a, TB1b from FIG. 4.

In further preferred specific embodiments, data are exchanged within a zone, i.e., intrazone communication, in particular, exclusively via trusted buffers, that is, second buffer storage area TB2a (FIG. 4) of this zone.

In further preferred specific embodiments, data is exchanged between zones, i.e., interzone communication, preferably via non-trusted buffers, that is, exchange buffer storage area TB1a, situated in shared RAM 1030a. In further preferred specific embodiments, if, e.g., data are intended to be transferred from zone Z1 to zone Z2, then they are preferably copied initially from a Z1 proxy to the corresponding Z1 non-trusted buffer and/or exchange buffer storage area TB1$a$, TB2$b$, B", verified by the corresponding Z2 proxy with regard to the validity of their contents, and, in the case of trustworthy, valid data that are correct with regard to content, copied by the Z2 proxy to the Z2 trusted buffer and/or second buffer storage area TB2$a$, B1_2. In further preferred specific embodiments, the copying operation after successful data verification, from the Z1 non-trusted buffer and/or exchange buffer storage area TB1$a$, TB2$b$, B3" to the Z2 trusted buffer and/or second buffer storage area TB2$a$, B1_2, is referred to as a zone transition. In further preferred specific embodiments, the verified, trustworthy data situated in the Z2 trusted buffer may be processed or forwarded appropriately within Z2; that is, in further preferred specific embodiments, the data verification takes place prior to the zone transition and, optionally, data usage.

A further measure to limit the attack surface of the computing device according to the specific embodiments is limiting access rights to running time, which, according to further preferred specific embodiments, may take place, e.g., under the control of a suitable operating system BS and/or supervisor SV.

In further preferred specific embodiments, e.g., an automotive open system architecture (AUTOSAR) BS, which, in further preferred specific embodiments, is reduced to a minimum with regard to its complexity (e.g., via configuration, etc.), may act as a basis for the lightweight embedded operating system BS, e.g., according to FIG. 4, described above by way of example.

In further preferred specific embodiments, even in the case of an escalation of privileges originating with a compromised processor core 102$a$ (FIG. 3), for example, misuse of supervisor mode in the lightweight embedded OS ISR, no invalid zone transition and/or invalid access by Z1 to the Z2 memory or running time is able to take place; reason: Static and highly reduced functionality of the lightweight embedded BS; consequently, in further preferred specific embodiments, partial functionalities in the supervisor mode do not permit, in particular, any misuse of privileges in the supervisor mode.

In further preferred specific embodiments, an ISR (interrupt program) running in the supervisor mode may only switch over between the static configuration data sets for the dedicated memory protection device for the relevant processor core.

In further preferred specific embodiments, identical static configuration data sets for the supervisor mode and user mode of the processor core only allow access to memory and/or running time, which are assigned to a relevant zone, such as first zone Z1.

In further preferred specific embodiments, an ISR running in the supervisor mode may not undertake any dynamic reconfiguration of the memory protection device(s); this is, in particular, implicitly achievable by a static, authentic configuration of integrity, of the memory protection device (s) during a start cycle, for example, during a cold start and/or during a warm start.

In further preferred specific embodiments, a task running in the user mode, which is assigned, for example, to first zone Z1, may not switch over between static configuration data sets of the memory protection device dedicated to a particular processor core, since, in further preferred specific embodiments, this switchover is possible exclusively in the supervisor mode.

In further preferred specific embodiments, a task, which runs in the user mode and is assigned, for example, to first zone Z1, may not undertake any dynamic reconfiguration of the memory protection device(s), which, in turn, is advantageously implicitly achievable by a static, authentic configuration of integrity, provided in further preferred specific embodiments, of the memory protection device(s) during the starting cycle, that is, e.g., during a cold start and/or during a warm start.

In further preferred specific embodiments, compared to operating system BS, in particular, to the lightweight embedded operating system, a supervisor SV, in particular, lightweight embedded supervisor, has additional monitoring functionalities. In the case of intracore zone separation (FIG. 5), tasks PXY of two zones Z1 and Z2 having different trust levels are preferably executed in a dedicated processor core 102$c$; two different static configuration data sets preferably being used here for Z1 tasks (tasks and/or instances assigned to first zone Z1) and Z2 tasks in the user mode, as well as, optionally, a further, static configuration data set for the supervisor mode, which controls, e.g., the switchover between the two static configuration data sets for the Z1 tasks and the Z2 tasks. In further preferred specific embodiments, an unused static configuration data set possibly remaining may be configured for tasks in the user mode in such a manner (for example, during a cold start and/or warm start), that it eliminates, e.g., general read, write and executive access to the complete memory, through which the security is increased further.

In further preferred specific embodiments, the supervisor mode may control monitoring of a non-trustworthy zone Z1, in particular, in the context of intracore zone separation, cf., e.g., the sequence according to FIG. 2M.

In further preferred specific embodiments, e.g., 3 or more zones Z1, Z2, Z3 (not shown) may be provided; first zone Z1 being, e.g., a highly trustworthy/highly confidential zone; second zone Z2 being, e.g., a trustworthy zone; and third zone Z3 being, e.g., a non-trustworthy zone.

In further preferred specific embodiments, the computing device may include, e.g., a microcontroller and/or may be made up of a microcontroller having a suitable number of processor cores.

Figure 22:
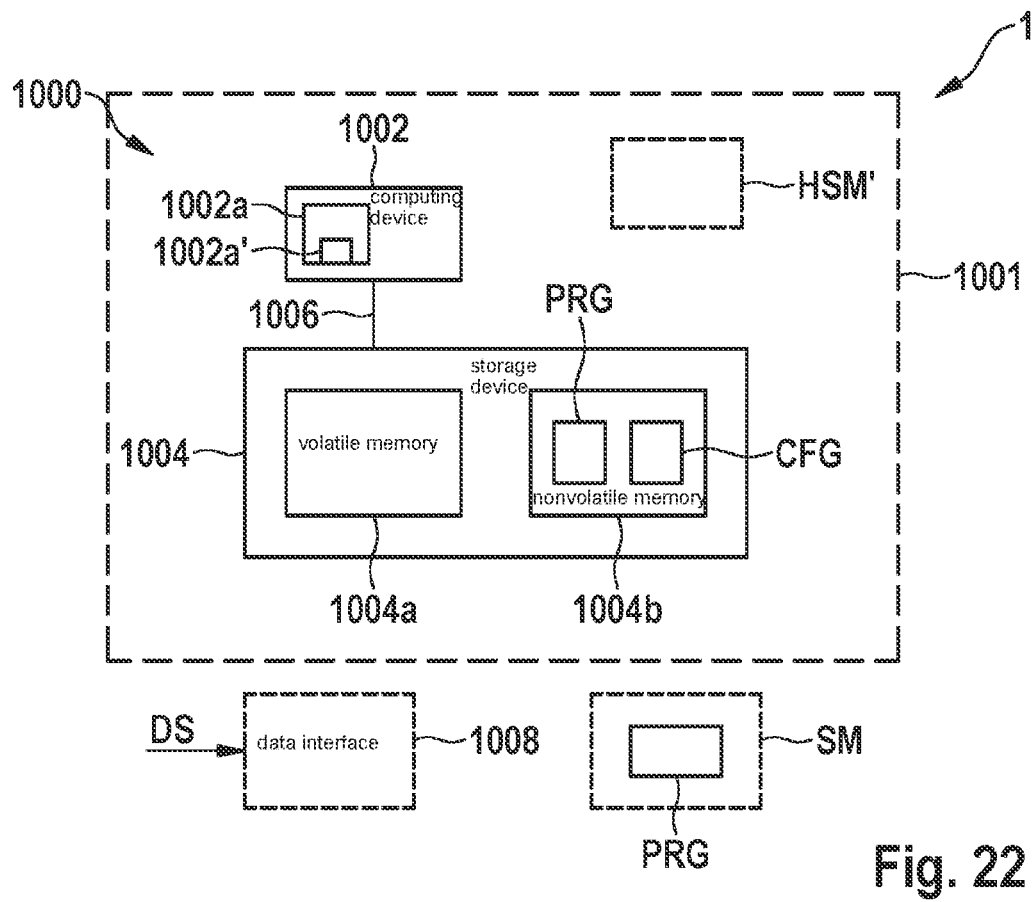
FIG. 22 shows a schematic, simplified block diagram of a device according to further preferred specific embodiments of the present invention.

Further preferred specific embodiments relate to a device 1000 for executing the method according to the specific embodiments, cf. the schematic block diagram shown in FIG. 22. Device 1000 includes a computing device 1002 having at least one processor core 1002$a$; processor core 1002$a$ optionally being able to be assigned at least one memory protection device 1002$a'$.

Device 1000 further includes a storage device 1004, which preferably has a volatile memory 1004$a$, e.g., working memory (RAM), and/or a nonvolatile memory 1004$b$, e.g., a flash-EEPROM and/or a ROM and/or an OTP memory. A computer program PRG, which includes commands that, in response to the execution of the program PRG by a computer 1002, cause it to carry out the method according to the specific embodiments, is preferably stored in ROM 1004$b$.

In further preferred specific embodiments, configuration data CFG for the operation of device 1000 are also stored in ROM 1004$b$. These configuration data CFG may also include, e.g., one or more configuration data (sets) KD, KD', KD1, KD2, KD3, KD4 for (the) at least one memory protection device 1002$a'$.

In further preferred specific embodiments, device 1000 includes at least one data bus 1006, which enables data to be exchanged between computing device 1002 and storage device 1004.

Further preferred specific embodiments relate to a computer-readable storage medium SM, including commands, in particular, in the form of a computer program PRG, which, in response to execution by a computer 1002, cause it to carry out the method according to the specific embodiments.

Further preferred specific embodiments relate to a data-carrier signal DS, which transmits the computer program PRG according to the specific embodiments. Device 1000 may preferably include a data interface 1008 for receiving data carrier signal DS, the data interface being preferably bidirectional.

In further preferred specific embodiments, computing device 1002 may also have a configuration according to computing device 100, 100a, as described above by way of example, with reference to, inter alia, FIG. 1, 3. In particular, in further preferred specific embodiments, it is also possible for the and/or a processor core 1002a of device 1000 according to FIG. 22 to execute at least some steps of the method according to the specific embodiments at least intermittently. In this respect, device 1000 may be understood, for example, as a possible target system for the computing device 100, 100a according to the specific embodiments, as well.

In further preferred specific embodiments, device 1000 also includes a hardware security module HSM' and/or cryptographic module HSM', e.g., for executing cryptographic functions. In further preferred specific embodiments, hardware security module HSM' may be used as a supervisor instance SVI.

In further preferred specific embodiments, device 1000 is configured as a microcontroller and/or microcontroller unit (MCU), in particular, as a single microcontroller (single MCU) and/or as a one-chip system (SoC, system-on-chip), in particular, as a single SoC.

In further preferred specific embodiments, device 1000 includes a, in particular, common, semiconductor substrate 1001 (die); at least one of the following elements being situated on the, in particular, common, semiconductor substrate 1001: a) the computing device 1002 having at least one processor core; b) storage device 1004; c) data bus 1006; d) the at least one memory protection device 1002a; d) (optional) hardware security module HSM'.

Consequently, the principle according to preferred specific embodiments advantageously allows the provision of a single-MCU system 1 and/or single-SoC system 1, with simultaneous separation into two or more zones Z1, Z2.

In further preferred specific embodiments, data may be exchanged between the different zones (intrazone and/or interzone data exchange), using, for example, buffers (buffer storage areas, exchange buffer storage areas) situated in a shared RAM (divided working memory, cf. reference character 1030a from FIG. 4); the shared RAM likewise being situated advantageously on the same common semiconductor substrate 1001 as computing device 1002 and/or its processor core(s) 1002a and, preferably, the further components 1006, HSM', 1002a of single-SoC system 1. This advantageously provides a high-performance and secure communications channel (inside the MCU and/or SoC) between the different zones Z1, Z2, which, according to further preferred specific embodiments, may also be scaled efficiently (e.g., a plurality of buffers with, as an option, further (additional) zones).

Preferred specific embodiments advantageously allow the "positioning" of different zones Z1, Z2, such as trustworthy (TZ) and non-trustworthy (NTZ) zones, and/or data processing regarding the data of the different zones Z1, Z2, on the same, preferably single, MCU system and/or SoC system 1.

In further preferred specific embodiments, the method and/or the device 100, 100a, 1000 according to the specific embodiments may be used in a control unit, e.g., a control unit for a motor vehicle, in particular, a control unit for an internal combustion engine of a motor vehicle, e.g., for at least one of the following applications: a) controlling the operation and/or operating state transition of the control unit; b) enabling and/or not enabling one or more functions of the control unit and/or of another component and/or of, e.g., the motor vehicle; c) changing into an error mode and/or operation under emergency conditions; d) making a fault storage entry; e) signaling an operating state to an external unit and/or a user; f) controlling an actuator.

Further preferred specific embodiments relate to a use of the method according to the specific embodiments and/or of the device 100, 100a, 1000 according to the specific embodiments and/or of the computer program PRG according to the specific embodiments, to check at least a subregion of storage device 1030, 1032, 1004 for changes and/or manipulations, in particular, prior to or during or after a change of the storage device and/or of a computing device 100, 100a, 1002 accessing the storage device, from a first operating state to a second operating state, and to control the operation, e.g., of a control unit of an internal combustion engine of a motor vehicle as a function of the check.

Figure 2U:
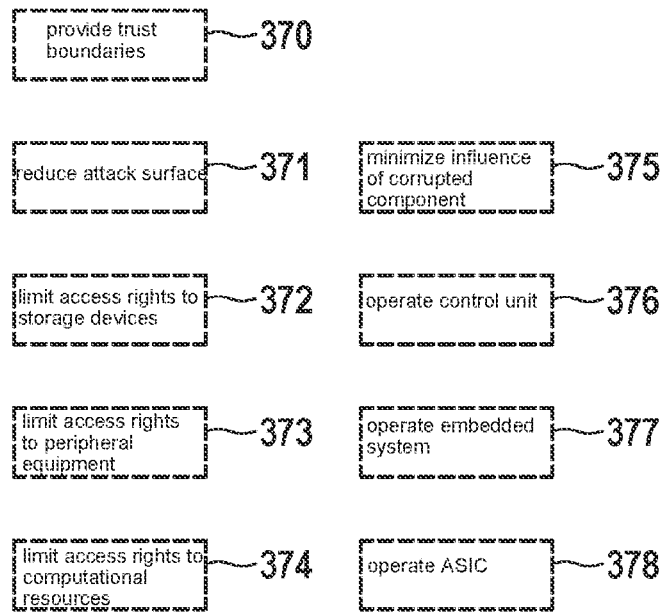

Further preferred specific embodiments, cf. FIG. 2U, relate to a use of the method according to the specific embodiments and/or of the device according to the specific embodiments and/or of the computer program according to the specific embodiments, for at least one of the following elements: a) providing 370 trust boundaries in computing device 100, 100a (FIG. 1), in particular, within a processor core 102c of the computing device, as well; b) reducing an attack surface for attacks on the computing device and/or one of its components; c) limiting 372 access rights to storage devices 1030, 1032; d) limiting 373 access rights to peripheral equipment 1034 (FIG. 3); e) limiting 374 (FIG. 2U) access rights to computational resources (e.g., characterizable by computing time, specifications of a processor core); e) minimizing 375 an influence of a corrupted component; f) operating 376 a control unit, in particular, for a vehicle, in particular, motor vehicle; g) operating 377 an embedded system, in particular, an Internet of Things, IoT, system; h) operating 378 an application-specific, integrated circuit, ASIC.

Figures 2V, 2W:
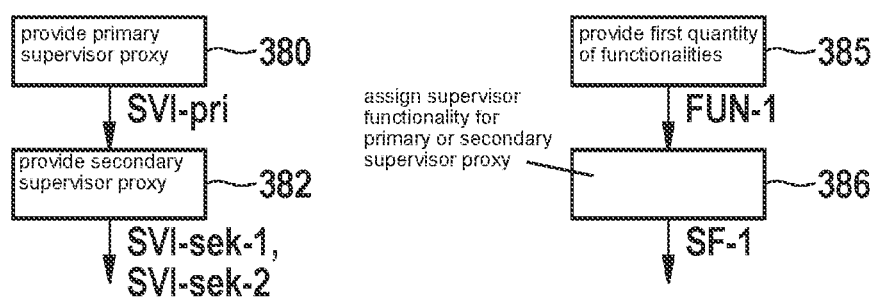

In further preferred specific embodiments, cf. FIG. 2V, the method further includes: a) providing 380 a primary supervisor proxy SVI-pri with the aid of supervisor instance SVI; b) providing 382 at least one secondary supervisor proxy SVI-sek-1, SVI-sek-2; in particular, the at least one secondary supervisor proxy SVI-sek-1, SVI-sek-2 being assigned to at least one processor core 102a, 102b, 102c, . . . , 102n; K1, K2, K3, K4 and/or to the at least one zone Z1, Z2 (for examples of details, see below, regarding FIG. 24).

It is further preferable for primary supervisor proxy SVI-pri to be produced and/or implemented with the aid of the on-chip trust anchor (TA).

In further preferred specific embodiments, cf. FIG. 2W, the method further includes: a) providing 385 a first quantity of functionalities FUN-1 for supervisor SV; b) assigning 386, in particular, dynamically, at least one supervisor functionality SF-1 of the first quantity of functionalities FUN-1 to the primary supervisor proxy SVI-pri and/or to the at least one secondary supervisor proxy SVI-sek-1; in particular, the assigning 386 being carried out as a function of at least one of the following elements: A) operating variable of computing device 100; 100*a*; 100*b*; B) operating mode of computing device 100; 100*a*; 100*b*; C) application of computing device 100; 100*a*; 100*b*.

Figure 24:
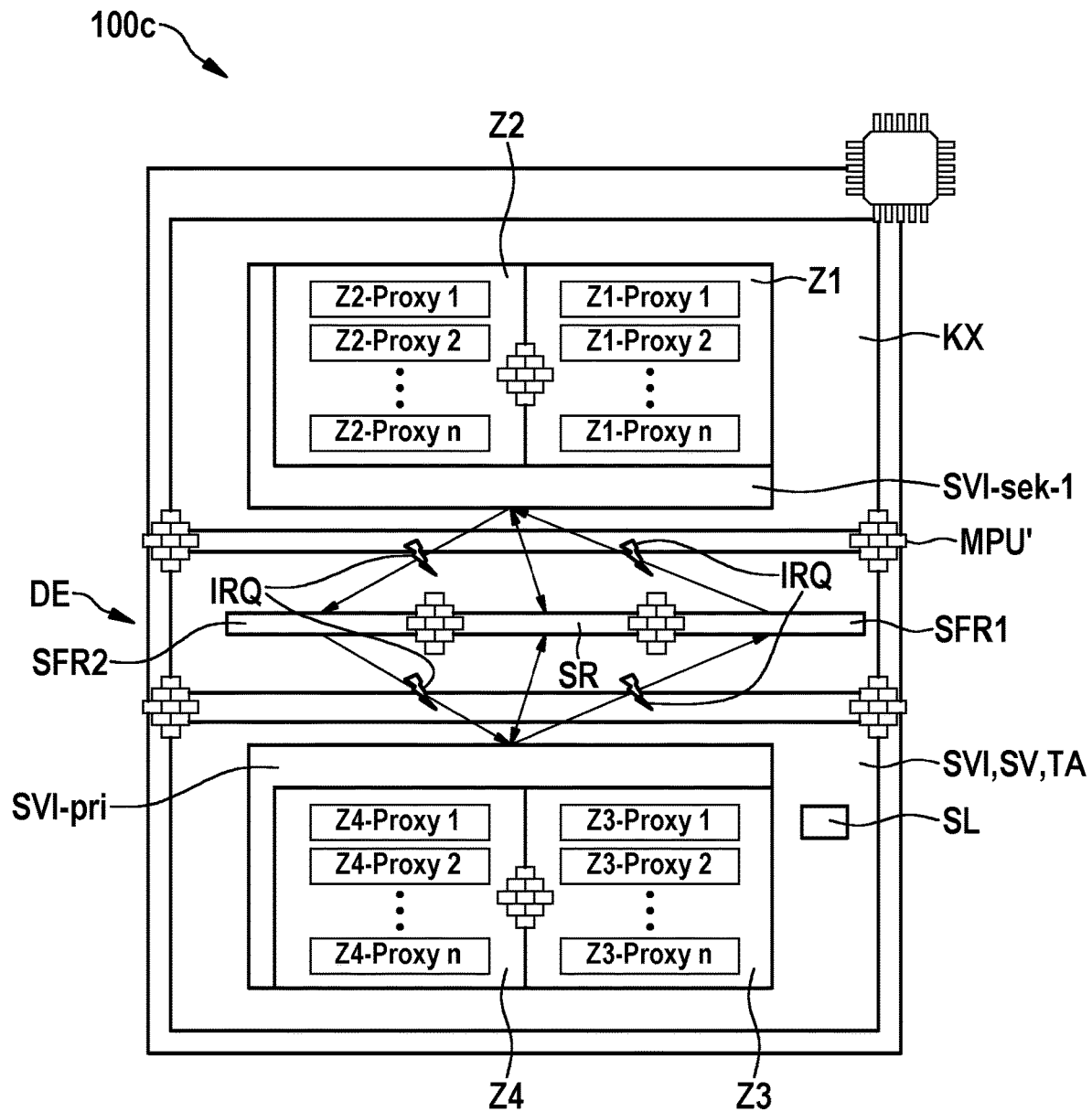
FIG. 24 shows a schematic, simplified block diagram according to further preferred specific embodiments of the present invention.

FIG. 24 schematically shows a simplified block diagram of a computing device 100*c* according to further preferred specific embodiments. Computing device 100*c* includes one or more processor cores, which are presently denoted collectively by reference character KX. Processor cores KX are assigned two zones Z1, Z2, which, as already described several times above by way of example, may be assigned one or more proxies Z1-Proxy 1, . . . , Z1-Proxy n, Z2-Proxy 1, . . . , Z2-Proxy n at least temporarily.

According to further preferred specific embodiments, a supervisor instance SVI, which is independent of the at least two zones Z1, Z2, is provided in computing device 100*c*. As an option, supervisor instance SVI may also be assigned one or more (separate) zones Z3, Z4; the zones Z3, Z4 preferably being independent of the at least two zones Z1, Z2, as well. For example, the two zones Z3, Z4*a* are assigned one or more proxies Z3-Proxy 1, . . . , Z3-Proxy n, Z4-Proxy 1, . . . , Z4-Proxy n at least temporarily; according to further preferred specific embodiments, the number of proxies per zone Z3, Z4 (optionally, Z1, Z2, as well) also being able to be different.

For example, it is preferable for at least one (dedicated) processor core of computing device 100*c* to be able to be used as a supervisor instance SVI. Alternatively, or in addition, in further preferred specific embodiments, at least one hardware security module HSM and/or one trusted platform module TPM may be used as a supervisor instance SVI.

In further preferred specific embodiments, an exchange of data DE between supervisor instance SVI and processor cores KX may be carried out, e.g., using one or more storage areas, in particular, using register memories, such as one or more register memories for special functions (special function register(s)). For example, in further preferred specific embodiments, a first register memory and/or a first group SFR1 of register memories is provided, in order to transmit data from supervisor instance SVI to cores KX (host cores). For example, in further preferred specific embodiments, a second register memory and/or a second group SFR2 of register memories is provided, in order to transmit data from cores KX to supervisor instance SVI.

For example, in further preferred specific embodiments, a working memory SR (shared RAM) is provided for common access by primary supervisor proxy SVI-pri and secondary supervisor proxy SVI-sek-1.

Register memory(ies) SFR2 are preferably readable and/or writable on the part of the host (that is, by at least one of processor cores KX), but preferably only readable from the perspective of supervisor instance SVI. In further preferred specific embodiments, writing of SFR2 on the part of the host (that is, writing of register memory(ies) SFR2 by at least one of processor cores KX) results, e.g., in an interrupt request IRQ on the part of supervisor instance SVI.

Register memory(ies) SFR1 are preferably readable and/or writeable on the part of the supervisor instance, but only readable from the perspective of processor cores KX. It is further preferable for the writing of register memory SFR1 on the part of the supervisor instance to result in an interrupt request IRQ on the part of the host KX.

In further preferred specific embodiments, as an option, register memory(ies) SFR1 may also be polled, in particular, interrogated cyclically, on the part of the host, in order to generate an interrupt request IRQ on the part of the host KX.

According to further preferred specific embodiments, when required, the shared RAM SR readable and writeable for the two sides, in particular, bidirectionally, in accordance with further preferred specific embodiments, may be used to exchange additional data and/or parameters between the two supervisor proxies SVI-pri, SVI-sek-1.

In further preferred specific embodiments, shared RAM SR may also be subdivided into areas (subregions), which: a) are bidirectionally readable and writeable; and/or b) are writeable (in particular, only) by the trust anchor TA and readable by the host KX; and/or c) are writeable (in particular, only) by host KX and readable by trust anchor TA.

In further preferred specific embodiments, shared RAM SR may optionally be split up into one main area per processor core (according to further preferred specific embodiments, at least for some of the plurality of processor cores). In further preferred specific embodiments, e.g., at least one, preferably, a plurality of, and/or all three, of the above-mentioned, three subregions a), b), c) may then be provided in this main area and/or in these main areas. According to further preferred specific embodiments, the main area(s) are also separated from each other with the aid of a respective memory protection device (MPU), so that, e.g., a first processor core is not able to write to the exchange area of a second processor core (e.g., to exchange data between the second processor core, using trust anchor TA, SVI).

In further preferred specific embodiments, data may be transmitted between cores KX and supervisor instance SVI, e.g., in a program-controlled and/or event-driven manner (e.g., with the aid of interrupt requests IRQ).

In further preferred specific embodiments, one or more memory protection devices MPU' may be provided, in order to separate different resource areas, in particular, storage areas, of the different components of computing device 100*c* among each other.

In further preferred specific embodiments, supervisor instance SVI characterizes and/or represents and/or constitutes a, in particular, especially, trustworthy instance of computing device 100*c*, preferably, a so-called on-chip trust anchor (TA).

According to further preferred specific embodiments, the TA represents the instance of the computing device 100*c* having the maximum trust level, which, according to further preferred specific embodiments, is usable, e.g., as a root of trust of a trust model.

According to further preferred specific embodiments, as already mentioned, a dedicated processor core or, preferably, if available, a dedicated security/cryptographic module, such as a hardware security module (HSM), trusted platform module (TPM), etc., may act as a TA.

Consequently, according to further preferred specific embodiments, a so-called trust-anchor (TA)-enforced secure zone supervision approach may be implemented; according to FIG. 24, by way of example, in each instance, a secondary supervisor proxy SVI-sek-1 being provided in the processor core(s) KX to be monitored, and a primary supervisor proxy SVI-pri being provided in the monitoring TA SVI in the form of an HSM in the example shown.

According to further preferred specific embodiments, the TA SVI has, preferably, unrestricted access to volatile memory 1004*a* (FIG. 22), such as RAM, nonvolatile memory 1004*b*, such as read-only memory (ROM) or flash, one-time programmable (OTP) memory, and special function registers SFR1, SFR2 (FIG. 25), in particular, to special function registers possibly present, of computing device 100c, as well.

According to further preferred specific embodiments, the principle according to preferred specific embodiments may be used, e.g., to configure and/or monitor, in particular, non-trustworthy and trustworthy (host) zones Z1 and Z2 for separating both the intracore and intercore zones already described above.

According to further preferred specific embodiments, e.g., the supervisor functionalities mentioned below by way of example may be shifted, in particular, as needed, between the host proxy SVI-sek-1 and primary supervisor proxy SVI-pri, in particular, as a function of the application; in particular, an increase in the supervisor functionalities implemented on the part of primary supervisor proxy SVI-pri resulting in a, in particular, significant improvement of the security:

1. Monitoring of zone Z1 (and optionally, zone Z2) for potential compromises and/or detection of potential compromises of zone Z1 (and/or zone Z2); it may preferably be accomplished, e.g., by monitoring a stack and/or program counter of zone Z1 (and/or of zone Z2), in particular, prior to activating a task assigned to respective zone Z1, Z2; detection of compromise prior to the execution of code; according to further preferred specific embodiments, the monitoring may optionally be carried out via cryptographic integrity and/or authenticity verifications, such as hash, message authentication code (MAC), etc., e.g., of the stack and/or program counter of Host-Z1 (and Host-Z2).

2. According to further preferred specific embodiments, at least one replacement response and/or error response is initiated in the case of a detected compromise. This may be accomplished, for example, by resetting zone Z1 (and/or zone Z2) into a secure state, in particular, one of integrity (e.g., via a power-off/on-reset), or into an error mode;

generating a log (that is, log file and/or fault storage) entry. In further preferred specific embodiments, log entries are stored at least temporarily in a secure and/or encrypted manner, in particular, in an optional, dedicated, and exclusive storage device SL of, preferably, supervisor instance SVI (cf. FIG. 24).

In further preferred specific embodiments, at least one of the following elements is provided: a) setting up an authentic and/or encrypted communications channel for transmitting, e.g., log entries, to at least one external instance (not shown), e.g., an intrusion detection system (IDS); b) coordinating and/or orchestrating (e.g., including scheduling (resource planning)) tasks of zones Z1, Z2 to be carried out, in particular, cyclically or in an event-driven manner; c) securely storing and/or processing a preferably static, host task list in the dedicated and exclusive TA storage device SL (FIG. 24); d) switching over between static configuration data sets (MPU sets), e.g., in host-MPU-SFR's for zone Z1 and/or zone Z2 tasks.

In further preferred specific embodiments, the supervisor functionality may be shifted completely to the TA SVI (FIG. 24); in particular, the privileged mode (supervisor mode) being able to be taken away completely or at least partially from the processor cores (not carrying out the supervisor functionality).

Preferred specific embodiments render possible at least some of the following effects at least temporarily and/or partially:

1. Minimizing the supervisor functionalities on the part of the host, reducing the attack surface (e.g., starting from a corrupted (host) zone Z1);

2. Transferring supervision of (host) zone(s) Z1 and/or (optionally) Z2 to a(n) (independent) TA instance SVI that is autonomous, in particular, with respect to these zones Z1, Z2; decoupling (host) zones from their monitoring; 3. Simple, secure, and high-performance cryptographic expansion of the supervision, since, e.g., supervision and cryptographic primitives are implemented in the same instance (TA SVI and/or HSM); cryptographic integrity and/or authenticity verifications of the stack and program counter (e.g., of zones Z1, Z2); encrypted storage of log entries in secure, dedicated, and exclusive TA storage device SL; setting up an authentic and/or encrypted communications channel, e.g., for transmitting log entries to an external instance, such as an IDS; 4. Secure storage of the static, host task list in TA storage device SL (integrity and/or authenticity protection); 5. Centralizing functionality for switching over static MPU sets to host MPU SFR's in the TA-side supervisor proxy; withdrawing functionality for switching-over on the part of the host; no switching-over is possible, even in the case of invalid escalation of privileges on the part of the host.

If, according to further preferred specific embodiments, the TA SVI has a, in particular, dedicated memory protection unit (MPU), then, according to further preferred specific embodiments, additional trust boundaries or zones Z3, Z4 may be introduced in the TA SVI. It is preferable for TA-side zones Z3, Z4 to be able to correlate with correspondingly higher trust levels than host-side zones Z1, Z2. The exemplary trust model visualized in FIG. 24 by way of example is based on the following zone architecture in descending trust levels:

TA-side: Zone Z4 (e.g., maximum trust level)
TA-side: Zone Z3
Host-side: Zone Z2
Host-side: Zone Z1 (e.g., minimum trust level)

In further preferred specific embodiments, e.g., within the scope of a secure boot mechanism, a host MPU configuration of integrity and/or an authentic host MPU configuration may also be executed and/or at least temporarily controlled by the TA SVI.

What is claimed is:

1. A method for operating a computing device for a control unit of a motor vehicle, the method comprising:

assigning at least one first program executable by a computing device to a non-trustworthy zone, wherein the computing device includes at least one processor core, wherein the computing device is configured to control an exchange of data between a connectivity zone and a security zone, the security zone including at least one component of the vehicle which is necessary to drive the vehicle and has an elevated relevance with regard to safety, and the connectivity zone including at least one component of the vehicle, whose operation requires communication outside of the vehicle but is not required to drive the vehicle and does not have an elevated relevance with regard to safety;

assigning at least one further program to a trustworthy zone;

assigning the component of the connectivity zone to the non-trustworthy zone; and assigning the component of the security zone to the trustworthy zone;

wherein the computing device includes at least one storage device having at least one first buffer storage area to which exclusively the first program assigned to the non-trustworthy zone has only read and/or only write access, and at least one second buffer storage area to which exclusively the further program assigned to the trustworthy zone has only read and/or only write access, and at least one exchange buffer storage area which allows the first program of the non-trustworthy zone only write access and the further program of the trustworthy zone only read access.

2. The method as recited in claim 1, wherein the at least one component necessary to drive the vehicle and having the elevated relevance with regard to safety includes an engine control unit, and/or a brake system, and/or a steering system.

3. The method as recited in claim 1, further comprising:
exchanging data between trustworthy zone and non-trustworthy zones, including:
copying the data to the first buffer storage area assigned to the non-trustworthy zone;
checking the copied data; and
as a function of the checking, copying the data from the first buffer storage area assigned to the non-trustworthy zone to the second buffer storage area assigned to the trustworthy zone.

4. The method as recited in claim 1, wherein the data are written from the first buffer storage area to the exchange buffer storage area.

5. The method as recited in claim 4, wherein the data located in the exchange buffer storage area are checked by the further program, in connection with a read access, and upon successful checking of the data, the data are copied from the exchange buffer storage area to the second buffer storage area.

6. The method as recited in claim 1, wherein an executive access to data in the first and/or in the second buffer storage area and/or in the exchange buffer storage area is prevented.

7. The method as recited in claim 1, wherein usage and transmission of the data occur, starting from the second buffer storage area.

8. The method as recited in claim 1, wherein access rights including read access and/or write access and/or executive access, to the storage device and/or to the first buffer storage area and/or to the second buffer storage area and/or to the exchange buffer storage area are implemented by a memory protection device.

9. The method as recited in claim 1, further comprising:
limiting, at least one of the following elements: a) read rights to storage devices assigned to the computing device, b) write rights to storage devices assigned to the computing device, c) executive rights to storage devices assigned to the computing device, the limiting being as a function of at least one zone by using at least one memory protection device at least temporarily, in order to control the read rights and/or the write rights and/or the executive rights.

10. The method as recited in claim 1, wherein the at least one processor core assumes a first operating mode at least temporarily, wherein, in the first operating mode, the at least one processor core inputting and/or writing configuration data, which control the operation of at least one memory protection device; and the at least one processor core assuming a second operating mode at least temporarily, in which the at least one processor core may not write and/or change the configuration data for the at least one memory protection device.

11. The method as recited in claim 10, further comprising: providing a plurality of sets of configuration data for the at least one memory protection device, at least one first set of the plurality of sets of configuration data being assigned to a first zone of the non-trustworthy zone and trustworthy zone, and at least one second set of the plurality of sets of configuration data being assigned to a second zone of the non-trustworthy zone and trustworthy zone.

12. The method as recited in claim 8, wherein configuration data of the memory protection device are configured statically and/or authentically after a validation, so that no change of the configuration data is possible in continuous operation, but at most, after a restart of the computing device.

13. The method as recited in claim 1, wherein a first instance of an application program is used as a first program, and a second instance of the application program is used as a second program, and the method further comprises: providing the first instance and the second instance, assigning the first instance to a first zone of the of the non-trustworthy zone and trustworthy zone, and assigning the second instance of the application program to a second zone of the non-trustworthy zone and trustworthy zone.

14. The method as recited in claim 1, further comprising:
allocating computing time resources to different programs and/or application programs and/or instances of application programs, as a function of the non-trustworthy zone and trustworthy zone.

15. The method as recited in claim 14, further comprising:
a) using an operating system for embedded systems to allocate computing time resources for different application programs and/or instances of application programs, wherein, in each instance, a processor core of the computing device being assigned an operating system; and/or
b) using a supervisor for embedded systems for allocating computing time resources to different application programs and/or instances of application programs, in each instance, a processor core of the computing device being assigned the supervisor.

16. The method as recited in claim 1, wherein the computing device executes a cold start at least intermittently, and wherein, during the cold start, data and/or program code is loaded from a nonvolatile memory; and wherein the computing device executes a warm start at least intermittently, wherein, during the warm start, data and/or program code being loaded from a volatile memory powered at least intermittently; wherein at least one memory protection device is configured during the cold start and/or the at least one memory protection device being configured during the warm start.

17. The method as recited in claim 1, further comprising at least one of the following elements: a) introducing at least one additional zone which is not already present; b) shifting functionalities from a first processor core to at least one further processor core of the computing device; c) implementing communication between at least two zones using a working memory integrated in the computing device; d) defining at least one trustworthy zone and, monitoring at least one further non-trustworthy zone, using at least one application program assigned to the trustworthy zone.

18. The method as recited in claim 1, further comprising:
using a supervisor for allocating computing time resources for different application programs and/or instances of application programs, the supervisor and/or a functionality corresponding to the supervisor being implemented at least partially with using a supervisor instance, which is independent of the non-trustworthy zone and trustworthy zone.

19. The method as recited in claim 1, wherein the computing device includes a plurality of processor cores, and wherein the method further comprises: a) assigning at least one of the processor cores to exactly one zone; and/or b) assigning at least one of the processor cores to more than one zone; and/or c) using at least one of the processor cores as a dedicated supervisor instance; and/or d) using at least one hardware security module and/or trusted platform module as a supervisor instance.

20. The method as recited in claim 19, further comprising: a) providing a primary supervisor proxy using the supervisor instance; b) providing at least one secondary supervisor proxy, the at least one secondary supervisor proxy being assigned to at least one of the processor cores and/or to at least one zone.

21. The method as recited in claim 20, further comprising: a) providing a first quantity of functionalities for the supervisor; b) assigning dynamically at least one supervisor functionality of the first quantity of functionalities to the primary supervisor proxy and/or to the at least one secondary supervisor proxy, the assigning being carried out as a function of at least one of the following elements: A) an operating variable of the computing device; B) an operating mode of the computing device; C) an application of the computing device.

22. The method as recited in claim 21, wherein the first quantity of functionalities and/or the at least one supervisor functionality includes at least one of the following elements: a) monitoring at least one zone for a potential compromise; b) detection of a compromise of at least one zone; c) monitoring at least one stack associated with at least one zone; d) monitoring at least one program counter associated with at least one zone, the monitoring being carried out prior to activation of a task of the relevant zone; e) detection of a compromise prior to execution of executable program code; f) using at least one cryptographic method for authenticity verification and/or integrity verification, in particular, for monitoring of a and/or the stack and/or monitoring a and/or the program counter, the cryptographic method including at least one of the following elements: f1) hash value generation, f2) generating a message authentication code (MAC).

23. A device, comprising:
a computing device configured to control an exchange of data between a connectivity zone and a security zone, the security zone including at least one component of the vehicle which is necessary to drive the vehicle and has an elevated relevance with regard to safety, and the connectivity zone including at least one component of the vehicle, whose operation requires communication outside of the vehicle but is not required to drive the vehicle and does not have an elevated relevance with regard to safety, at least one first program executable by the computing device being assigned to a non-trustworthy zone, at least one further program being assigned to a trustworthy zone, the component of the connectivity zone being assigned to the non-trustworthy zone; and the component of the security zone being assigned to the trustworthy zone;
wherein the computing device includes at least one storage device having at least one first buffer storage area to which exclusively the first program assigned to the non-trustworthy zone has only read and/or only write access, and at least one second buffer storage area to which exclusively the further program assigned to the trustworthy zone has only read and/or only write access, and at least one exchange buffer storage area which allows the first program of the non-trustworthy zone only write access and the further program of the trustworthy zone only read access; and
wherein the computing device is situated on a common semiconductor substrate on which is also situated the storage device, a data bus, a memory protection device, and a hardware security module.

* * * * *